(12) United States Patent
Tamaoki

(10) Patent No.: US 7,724,424 B2
(45) Date of Patent: May 25, 2010

(54) OPTICAL MODULE AND OPTICAL AMPLIFICATION MODULE

(75) Inventor: Shinobu Tamaoki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 234 days.

(21) Appl. No.: 11/785,927

(22) Filed: Apr. 20, 2007

(65) Prior Publication Data

US 2008/0002251 A1    Jan. 3, 2008

Related U.S. Application Data

(60) Provisional application No. 60/837,611, filed on Aug. 15, 2006.

(30) Foreign Application Priority Data

Apr. 21, 2006 (JP) ............ P2006-118225
Aug. 8, 2006 (JP) ............ P2006-215980

(51) Int. Cl.
 *H04B 10/17* (2006.01)
 *H04B 10/12* (2006.01)
(52) U.S. Cl. ............... 359/341.3; 359/341.5
(58) Field of Classification Search ............. 359/341.3, 359/341.5
 See application file for complete search history.

(56) References Cited

U.S. PATENT DOCUMENTS 5,363,234 A * 11/1994 Newhouse et al. ..... 359/341.32
6,574,406 B2 * 6/2003 Ainslie et al. ............... 385/123
2003/0063629 A1 * 4/2003 Davis et al. .................... 372/6
2004/0233941 A1 * 11/2004 Fajardo et al. ................. 372/6
2004/0252961 A1 * 12/2004 Peuchert et al. ............. 385/141
2005/0201427 A1 * 9/2005 Luo et al. ..................... 372/23
2005/0276286 A1 * 12/2005 MacCormack et al. ........ 372/10

FOREIGN PATENT DOCUMENTS

JP          3415499         6/2003

OTHER PUBLICATIONS

Komukai et al., "Upconversion Pumped Thulium-Doped Fluoride Fiber Amplifier and Laser Operating at 1.47 μm," IEEE Journal of Quantum Electronics, Nov. 1995, vol. 31, No. 11, pp. 1880-1889.
Sugioka et al., "Laser Micro-Nano Processing," First Edition, Nov. 2004, pp. 67-68, CMC Publishing, Japan (with partial English translation).

* cited by examiner

*Primary Examiner*—Eric Bolda
(74) *Attorney, Agent, or Firm*—McDermott Will & Emery LLP

(57) ABSTRACT

An optical module for supplying pump light for amplifying to-be-amplified light includes an pump light source, optical coupling means, and an optical guide section. The optical guide section optically connects the pump light source and the optical coupling means, and propagates the pump light from the pump light source, in multi-transverse-mode. The optical coupling means output the pump light from the optical guide section in multi-transverse-mode, and at least one of (i) at least one of end faces where the optical guide section and the optical coupling means are connected, (ii) an area between the end faces, and (iii) the optical guide section, has a loss medium of which transmission loss is greater in a wavelength of the to-be-amplified light than in a wavelength of the pump light. By this, an optical module which can stably supply the pump light to the optical amplification fiber can be provided.

18 Claims, 16 Drawing Sheets

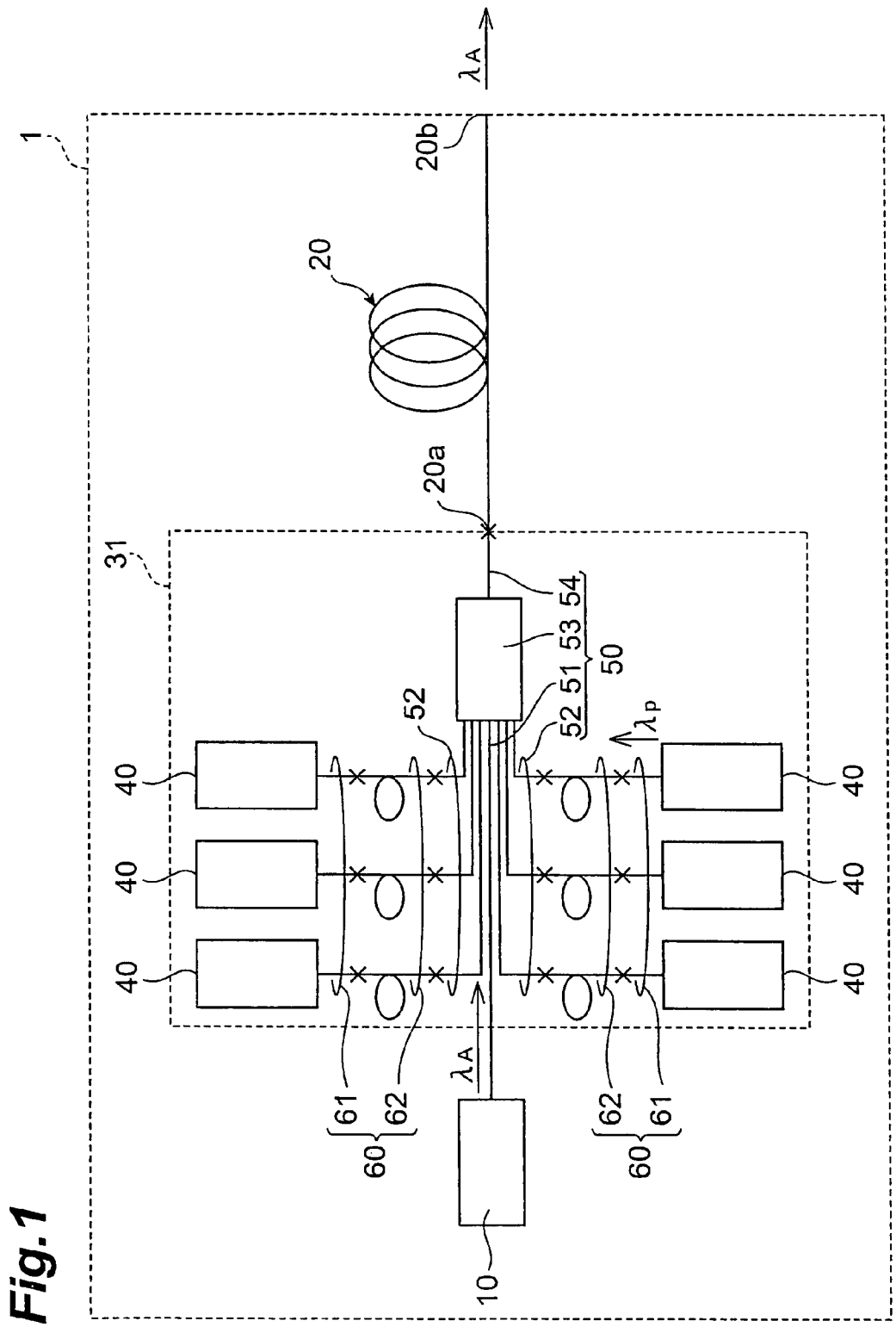

US 7,724,424 B2

OPTICAL MODULE AND OPTICAL AMPLIFICATION MODULE

CROSS-REFERENCE TO RELATED APPLICATIONS

This application claims propriety to the Provisional Application Ser. No. 60/837,611 filed on Aug. 15, 2006 by the same Applicant, which is hereby incorporated by reference in its entirety.

BACKGROUND OF THE INVENTION

1. Field of the Invention

The present invention relates to an optical module and an optical amplification module.

2. Description of the Related Art

Processing technology using a laser beam is receiving attention, and the demand for an optical amplification module that can generate a high power laser beam is increasing in respective fields, including the medical field. For an optical amplification module, a double clad type where an optical fiber in which a rare earth element that can be excited by an pump light is added to the core area is used as an optical fiber for application, is known, as stated in Koji Sugioka and Akira Yabe, "Laser Micro Nano Processing", First Edition, Japan, CMC Publishing, November 2004, pp. 67-68 (hereafter called the Non-patent Document), for example. The optical amplification module stated in the Non-patent Document is used as a fiber laser light source, and supplies the pump light to the optical amplification fiber using an optical module comprised of and LD with a fiber and optical coupling means.

A to-be-amplified light and an pump light are supplied to an optical amplification fiber of an optical amplification module normally using an optical module, as shown in FIG. 7 and FIG. 14.

An optical module 140 of an optical amplification module 130, shown in FIG. 7, is comprised of an pump light source 40 and optical coupling means 50 which are optically connected via an optical fiber 141, and the pump light from the pump light source 40 is input to the optical coupling means 50 through the optical fiber 141. Also in the optical amplification module 130, a light source 10 is optically connected to an optical fiber 51 of the optical coupling means 50, and the optical coupling means 50 multiplexes the to-be-amplified light, which is output from the light source 10, and an pump light, which is output from the pump light source 40, and inputs it to an optical amplification fiber 20. As a result, the to-be-amplified light is optically amplified in the optical amplification fiber 20, and is output as high power light.

An optical module 160 of an optical amplification module 150, shown in FIG. 14, is comprised of an pump light source 40 and optical coupling means 170 for multiplexing an pump light and a to-be-amplified light and for inputting the multiplexed light to an optical amplification fiber. The optical coupling means 170 is further comprised of an optical fiber 51 as an input port of the to-be-amplified light, an optical fiber 171 as an input port of the pump light, an optical coupling section 53 as a multiplexing medium of the to-be-amplified light and the pump light, and an optical fiber 54 as an output port, and a light source 10 is connected to the optical fiber 51 and an optical amplification fiber 20 is connected to the optical fiber 54. By this configuration, the to-be-amplified light and the pump light, which are output from the light source 10 and the pump light source 40, are input to the optical amplification fiber 20 via the optical coupling means 170. And the to-be-amplified light is optically amplified in the optical amplification fiber 20, and is output as high power light.

In order to output an even higher power light from the optical amplification fiber 20 in the above mentioned optical amplification module 130 and 150, multi-mode fibers for propagating the pump light in multi-mode could be used as the optical fiber 141 and the optical fiber 171.

However if the optical amplification fiber 20 in the optical amplification modules 130 and 150 is connected to another optical fiber, shown in FIG. 7 and FIG. 14, a connection loss is generated in the connected portion, and the to-be-amplified light for the amount of this loss may propagate in the optical amplification fiber 20 in a direction opposite from the propagation direction of the pump light. In this case, if the optical fiber 141 or 171 is a multi-mode fiber, the multi-mode fiber has the nature to easily confine light, other than the pump light, in the fiber because the core diameter and NA are large, so high power to-be-amplified light, which propagates in a direction opposite from the pump light, may propagate to the pump light source 40. In this case, the pump light source 40 may be damaged and operation thereof may become unstable, then pump light may not be able to be stably supplied to the optical amplification fiber, and as a result, high power light may not be generated.

With the foregoing in view, it is an object of the present invention to provide an optical module and an optical amplification module which can stably supply pump light to an optical amplification fiber.

SUMMARY OF THE INVENTION

An optical module according to the present invention is an optical module for supplying pump light for amplifying to-be-amplified light, comprising: an pump light source; optical coupling means; and an optical guide section, wherein the optical guide section optically connects the pump light source and the optical coupling means and propagates the pump light, which is output from the pump light source, in multi-transverse-mode, and the optical coupling means has a first input port to which the to-be-amplified light is input, a second input port to which the pump light from the optical coupling means is input, and an output port having a fiber structure for outputting the to-be-amplified light, and the pump light is outputs from the first input port or the output port in multi-transverse-mode, at least one of (i) at least one of end faces, of which the optical guide section and the optical coupling means are connected, (ii) an area between the ends faces of the optical guide section and the optical coupling means, and (iii) the optical guide section, has a loss medium of which transmission loss is greater in a wavelength of the to-be-amplified light than in a wavelength of the pump light, in the optical guide section and the optical coupling means.

An optical module with the above configuration_can preferably be employed for supplying pump light to an optical amplification fiber, for example. When the optical module and the optical amplification fiber are connected so that the pump light is input to the optical fiber via the optical coupling means, the pump light, which is output from the pump light source, propagates the optical guide section in multi-transverse-mode, then is input to the optical amplification fiber via the optical coupling means. In this way, if the to-be-amplified light is being supplied in the optical amplification fiber when the pump light is input to the optical amplification fiber, the to-be-amplified light is optically amplified, so high power light can be generated. And the optical guide section propagates the pump light in multi-transverse-mode, so more pump lights are input to the optical amplification fiber. As a result, the power of the light to be output from the optical amplification fiber is further increased.

When the optical amplification fiber is connected with another optical fiber, if a connection loss is generated in a connected area because of a mismatch of mode field diameters (MFD), for example, the to-be-amplified light for the amount of the connection loss may propagate to the pump light source, which is in a direction opposite from the propagation direction of the pump light.

In the case of an optical module with the above configuration, at least one of (i) at lease one of end faces, of which the optical guide section and the optical coupling means are connected, (ii) an area between said end faces of the optical guide section and the optical coupling means, and (iii) the optical guide section, has a loss medium of which transmission loss is greater in a wavelength of the to-be-amplified light than in a wavelength of the pump light, so the to-be-amplified light which propagates in a direction opposite from the propagation direction of the pump light never reaches the pump light source while maintaining an intensity strong enough to affect the pump light source. As a result, the pump light source is not damaged and operation thereof does not become unstable, and the pump light can be stably supplied to the optical amplification fiber.

An optical amplification module according to the present invention comprises the optical module according to the above mentioned invention, and an optical amplification fiber to which the pump light from the optical coupling means is input and which amplifies and outputs to-be-amplified light, wherein the optical amplification fiber comprises a second core area, a third clad area having a refractive index lower than a refractive index of the second core area, and a fourth clad area provided in an outer circumference of the third clad area and having a refractive index lower than the refractive index of the third clad area, and the to-be-amplified light is propagated in the second core area, and the pump light from the optical coupling means is propagated in the second core area and the third clad area.

The optical amplification fiber of the optical amplification module and the optical amplification module according to the present invention is a double clad type optical fiber where the third and fourth clad areas are formed in an outer circumference of the second core area. More pump lights can be propagated in this optical amplification fiber which propagates the pump lights in the second core area and the third clad area, therefore the to-be-amplified light can be amplified even more efficiently.

In the optical module and optical amplification module according to the present invention, it is preferable that the optical guide section comprises an optical fiber for guiding having a first core area for propagating the pump light in multi-transverse-mode, and a first clad area which has a refractive index lower than a refractive index of the first core area, and an element as the loss medium is added to the first core area.

In the case of this configuration, even if a connection loss is generated at the edge section of the optical amplification fiber and the to-be-amplified light for this amount of loss propagates in a direction opposite from the propagation direction of the pump light, a large transmission is generated with certainty by the rare earth element when the to-be-amplified light passes through the optical guide section. Therefore the to-be-amplified light propagating in a direction opposite from the propagation direction of the pump light never reaches the pump light source while maintaining an intensity high enough to affect the pump light source. As a result, the pump light source is not damaged and operation thereof does not become unstable, and the pump light can be stably supplied to the optical amplification fiber by the optical module.

In the optical module and optical amplification module according to the present invention, it is also preferable that the optical guide section comprises a first optical fiber for guiding and a second optical fiber for guiding, and the loss medium is provided between the first and second optical fibers for guiding.

In this case, the pump light, which is output from the pump light source, propagates through the first and second optical fibers for guiding in multi-transverse-mode and is input with certainty to the optical coupling means. The loss medium is formed between the first and second optical fibers for guiding, so even if a connection loss is generated at the edge section of the optical amplification fiber and the to-be-amplified light for this amount of loss propagates toward the pump light source via the optical coupling means and optical guide section, a large transmission loss is generated when the to-be-amplified light passes through the loss medium. Therefore the to-be-amplified light propagating in a direction opposite from the propagation direction of the pump light never reaches the pump light source while maintaining an intensity high enough to affect the pump light source. As a result, the pump light source is not damaged and operation thereof does not become unstable, and the pump light can be stably supplied to the optical amplification fiber.

In the optical module and optical amplification module according to the present invention, it is also preferable that the loss medium is a coating formed on a fiber end face of at least one of the first and second optical fibers for guiding.

In this case, the loss medium is formed on a fiber end face of at least one of the first and second optical fibers for guiding, so the loss medium can be formed with certainty between the first and second optical fibers for guiding. In the optical module and optical amplification module according to the present invention, it is also preferable that the loss medium is a coating formed on at least one of end faces of which the optical guide section and the optical coupling means are connected.

Preferably, the element as the loss medium is a rare earth element. It is also preferable that Yb is added to the optical amplification fiber when the loss medium is Tm.

The present invention is also related to a following optical module and optical amplification module.

In other words, an optical module according to the present invention is an optical module for amplifying to-be-amplified light, comprising: an pump light source; optical coupling means; and an optical fiber for guiding, wherein the optical coupling means optically connects the pump light source and the optical fiber for guiding, and outputs the pump light from the pump light source to the optical fiber for guiding, the optical fiber for guiding comprises a first core area, a first clad area provided in an outer circumference of the first core area and having a refractive index lower than a refractive index of the first core area, and a second clad area provided in an outer circumference of the first clad area and having a refractive index lower than the refractive index of the first clad area, the to-be-amplified light is propagated in the first core area, and the pump light from the optical coupling means is propagated in multi-transverse-mode in the first core area and the first clad area, and an element having a transmission loss which is greater in a wavelength of the to-be-amplified light than in a wavelength of the pump light is added to the first clad area.

According to this configuration, if the optical amplification fiber is, for example, optically connected to the optical fiber for guiding, the pump light, which is output from the pump light source, is input to the optical fiber for guiding via the optical coupling means, propagates through the first core area and first clad area of the optical fiber for guiding, and then is input to the optical amplification fiber. In this way, if the to-be-amplified light is being supplied in the optical amplification fiber when the pump light is input to the optical amplification fiber, the to-be-amplified light is optically amplified in the optical amplification fiber, so high power light can be generated.

As described above, if a connection loss is generated by a mismatch of mode field diameters (MFD) at a connected portion when the optical amplification fiber and another fiber are connected, for example, the to-be-amplified light for the amount of the connection loss may propagate toward the pump light source in a direction opposite from the propagation direction of the pump light.

In the case of the optical module with the above mentioned configuration, the optical fiber for guiding is disposed between the optical coupling means and the optical amplification fiber by optically connecting the optical fiber for guiding and the optical amplification fiber. An element having a transmission loss which is greater in a wavelength of the to-be-amplified light than in a wavelength of the pump light is added to the first clad area of the optical fiber for guiding, so the to-be-amplified light which propagates in a direction opposite from the propagation direction of the pump light never reaches the pump light source while maintaining a power high enough to affect the pump light source. As a result, the pump light source is not damaged and operation thereof does not become unstable, and the pump light can be stably supplied to the optical amplification fiber.

An optical amplification module according to the present invention comprises the optical module according to the present invention, and an optical amplification fiber to which the pump light from the optical fiber for guiding and which amplifies and outputs to-be-amplified light, wherein the optical amplification fiber comprises a second core area, a third clad area provided in an outer circumference of the second core area and having a refractive index lower than a refractive index of the second core area, and a fourth clad area provided in an outer circumference of the third clad area and having a refractive index lower than the refractive index of the third clad area, the to-be-amplified light is propagated in the second core area, and the pump light from the optical fiber for guiding is propagated in the second core area and the third clad area.

The configuration of the optical amplification fiber of this optical amplification module is a double clad type optical fiber where the third and fourth clad areas are formed in the outer circumference of the second core area. In this optical amplification fiber, the pump light is propagated in the second core area and the third clad area, so more pump light can be propagated and the to-be-amplified light can be amplified more efficiently.

In the optical amplification module according to the present invention, it is preferable that when the to-be-amplified light which is output from the optical fiber for guiding is input to the optical amplification fiber, a mode field diameter of the optical amplification fiber is the same as or greater than a mode field diameter of the optical fiber for guiding in a wavelength of the to-be-amplified light.

When the to-be-amplified light, which is output from the optical fiber for guiding, is input to the optical amplification fiber, the connection loss of the to-be-amplified light is decreased since the MFDs, with respect to the wavelengths of the to-be-amplified light in the optical fiber for guiding and the optical amplification fiber, satisfy the above relationship, so entry of the to-be-amplified light to the pump light source can be further suppressed. As a result, the pump light can be supplied to the optical amplification fiber even more stably.

In the optical amplification module according to the present invention, it is preferable that when the to-be-amplified light, which is output from the optical amplification fiber, is input to the optical fiber for guiding, a mode field diameter of the optical amplification fiber is the same as or smaller than a mode field diameter of the optical fiber for guiding in a wavelength of the to-be-amplified light.

When the to-be-amplified light, which is output from the optical amplification fiber, is input to the optical fiber for guiding, the communication loss of the to-be-amplified light is decreased since the MFDs, with respect to the wavelengths of the to-be-amplified light in the optical fiber for guiding and the optical amplification fiber, satisfy the above relationship, so entry of the to-be-amplified light to the pump light source can be further suppressed. As a result, the pump light can be supplied to the optical amplification fiber even more stably.

It is also preferable that the optical amplification module according to the present invention further comprises another optical coupling means which is different from the optical coupling means and another optical fiber for guiding which is different from the optical fiber for guiding when the to-be-amplified light, which is output from the optical amplification fiber, is input to the optical fiber for guiding, wherein: the optical fiber for guiding and the other optical fiber for guiding are separately disposed on both sides of the optical amplification fiber, and are optically connected to the optical amplification fiber; the to-be-amplified light and the other pump light which is different from the pump light are input to the other optical coupling means, and the other optical coupling means outputs the to-be-amplified light and the other pump light, which have been input, to the other optical fiber for guiding; the other optical fiber for guiding inputs the to-be-amplified light and the other pump light, which have been input, to the optical fiber for guiding of the optical amplification fiber; the other optical fiber for guiding comprises a fifth core area, a fifth clad area provided in an outer circumference of the third core area and having a refractive index lower than a refractive index of the third core area, and a sixth clad area provided in an outer circumference of the fifth clad area and having a refractive index lower than the refractive index of the fifth clad area; the to-be-amplified light is propagated in the third core area and other pump light from the other optical coupling means is propagated in multi-transverse-mode in the third core area and the fifth clad area; an element having transmission loss which is greater in a wavelength of the to-be-amplified light than in a wavelength of the other pump light is added to the fifth clad area; and a mode field diameter of the optical fiber for guiding is the same as or greater than a mode field diameter of the other optical fiber for guiding in the wavelength of the to-be-amplified light.

In this configuration, the optical fiber for guiding and the other optical fiber for guiding are optically connected to both sides of the optical amplification fiber respectively. And the pump light is supplied to the optical amplification fiber via the optical coupling means and the optical fiber for guiding. The other pump light, which is input to the other optical fiber for guiding through the other optical coupling means, propagates through the third core area and the fifth clad area of the other optical fiber for guiding, and is input to the optical amplification fiber. Since the pump light and the other pump light are input from the optical fiber for guiding and the other optical fiber for guiding to the optical amplification fiber like this, the to-be-amplified light, which is input to the optical amplification fiber via the other optical fiber for guiding, can be efficiently amplified in the optical amplification fiber, and this amplified light can be output to the optical fiber for guiding. An element having a transmission loss which is greater in the wavelength of the to-be-amplified light than in the wavelength of the pump light is added to the first clad area of the optical fiber for guiding and the fifth clad area of the other optical fiber for guiding, therefore the to-be-amplified light never reaches the pump light source while maintaining a power high enough to affect the pump light source. As a result, the pump light source is not damaged and operation thereof does not become unstable, and the pump light can be stably supplied to the optical amplification fiber.

Since the MFDs with respect to the wavelengths of the to-be-amplified light in the optical fiber for guiding and the optical fiber for guiding satisfy the above relationship, entry of the to-be-amplified light to the pump light source can be further suppressed, and as a result, the pump light can be supplied to the optical amplification fiber even more stably.

Preferably, the element is a rare earth element. Also it is preferable that when the element of the optical module is Tm, Yb is added to the optical amplification fiber.

The present invention will be more fully understood from the detailed description given herein below and the accompanying drawings, which are given by way of illustration only and are not to be considered as limiting the present invention.

Further scope of applicability of the present invention will become apparent from the detailed description given herein after. However it should be understood that the detailed description and specific examples, while indicating preferred embodiments of the invention, are given by way of illustration only, since various changes and modification within the spirit and scope of the invention will be apparent to those skilled in the art from this detailed description.

BRIEF DESCRIPTION OF THE DRAWINGS

FIG. 1 is a block diagram depicting a configuration of an embodiment of an optical amplification module to which an embodiment of an optical module according to the present invention is applied;

DESCRIPTION OF THE PREFERRED EMBODIMENTS

Figure 2A:
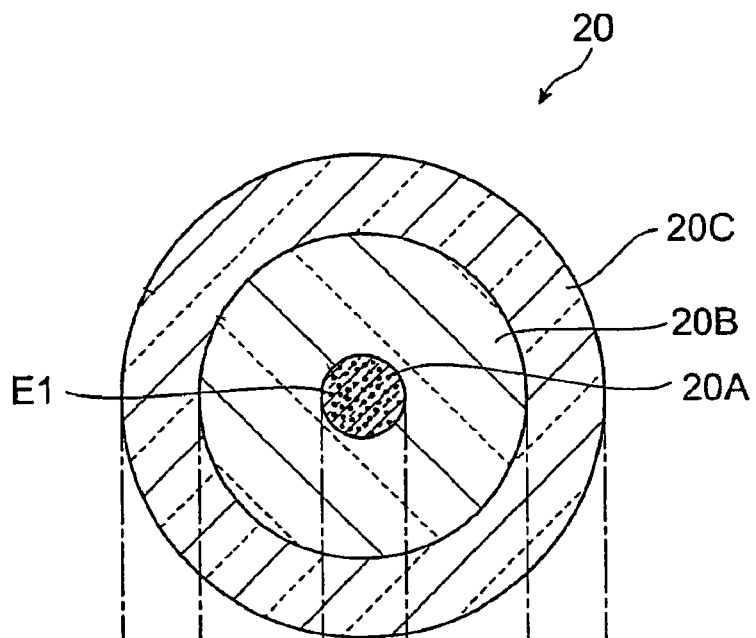
FIG. 2A is a cross-sectional view depicting the optical amplification fiber shown in FIG. 1 sectioned perpendicular to the longitudinal direction.

Embodiments of the optical module and the optical amplification module according to the present invention will now be described with reference to the drawings. In the description of the drawings, the same composing elements are denoted with the same reference numerals and redundant description is omitted. The dimensional ratios in the drawings do not always match with those in the description.

First Embodiment

FIG. 1 is a block diagram depicting a configuration of an optical amplification module according to the first embodiment. The optical amplification module 1 is used as a laser light source of an optical processing system, where an embodiment of the optical module according to the present invention is applied.

The optical amplification module 1 comprises a light source 10 which outputs a laser beam for processing having wavelength $\lambda_A$ as the to-be-amplified light, an optical amplification fiber 20 for optically amplifying the laser beam for processing using an pump light, and an optical module 31 for supplying the laser beam for processing and the pump light to the optical amplification fiber 20. The light source 10 is a laser diode (LD), for example. The light source 10 outputs the laser beam to be amplified as mentioned above.

Figure 2B:
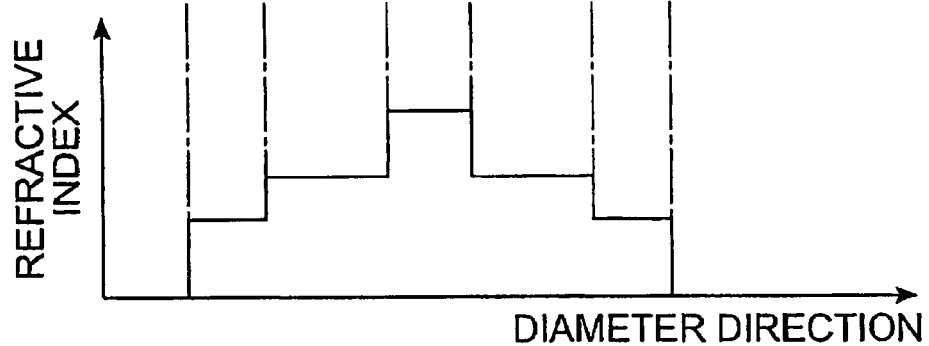
FIG. 2B is a diagram depicting a refractive index distribution of the optical amplification fiber in the diameter direction.

FIG. 2A is a cross-sectional view depicting the optical amplification fiber sectioned perpendicular to the longitudinal direction. FIG. 2B is a diagram depicting a refractive index distribution of the optical amplification fiber.

The optical amplification fiber 20, of which major component is $SiO_2$, is a double clad type optical fiber comprised of a core area (second core area) 20A, a clad area (third clad area) 20B which is formed in an outer circumference of the core area 20A, and a clad area (fourth clad area) 20C which is formed in an outer circumference of the clad area 20B. An example of the diameter of the core area 20A is 10 μm, and an example of the diameter of the clad area 20B is 100 μm, and the diameter of the clad area 20C is 125 μm.

A rare earth element (hereafter called "element for optical amplification) E1, which optically amplifies the laser beam for processing by the pump light being supplied, such as Yb and Er, is added to the core area 20A of the optical amplification fiber 20. In FIG. 2A, the element for optical amplification E1 is schematically shown. A rare earth element for amplifying the laser beam for processing may be added to the clad area 20B, but in this case, a rare earth element having a transmission loss which is greater in a wavelength of the pump light than in a wavelength of the laser beam for processing is preferable.

As FIG. 2B shows, the refractive index of the clad area 20B is lower than the refractive index of the core area 20A, and the refractive index of the clad area 20C is lower than the refractive index of the clad area 20B. The refractive index distribution shown in FIG. 2B can be formed by using a refractive index adjusting agent, such as Ge.

The optical amplification fiber 20 propagates the laser beam for processing in single mode in the core area 20A, and propagates the pump light in multi-transverse-mode in the core area 20A and the clad area 20B. The core are 20A is sufficient if the laser beam for processing can be propagated, and may propagate the laser beam for processing in multi-transverse-mode. A transverse-mode is a mode which has a field vector perpendicular to the optical propagation direction. In TE mode, an electric field vector is perpendicular to the optical propagation direction. In TM mode, magnetic field vector is perpendicular to the optical propagation direction. In TEM mode, both of an electric field vector and magnetic field vector are perpendicular to the optical propagation direction. The optical amplification fiber 20 may be a triple clad type optical fiber which has a refractive index layer (a clad area) which is disposed between the core area 20A and a inner clad area (the clad area 20B) and has a refractive index that intermediate between the refractive index of the core area 20A and the refractive index of the inner clad area.

As FIG. 1 shows, the optical module 31 has a plurality (six in the case of FIG. 1) of pump light sources 40 for outputting laser beams having wavelength $\lambda_P$ as pump lights, optical coupling means 50 for inputting the laser beam for processing and the pump light to the optical amplification fiber 20, and optical guide sections 60 which connect the optical coupling means 50 and each pump light source 40, and propagate the pump lights in multi-transverse-mode. The pump light source 40 is a LD, for example.

The optical coupling means 50 has an optical fiber 51 for propagating the laser beam for processing and a plurality of optical fibers 52 for propagating the pump lights in multi-transverse-mode. The optical fiber 51 is connected to the light source 10, and functions as an input port (first input port) of the laser beam for processing which is output from the light source 10. The optical fibers 52 are connected to the optical guide section 60, and function as input ports (second input ports) of the pump lights which are output from the pump light sources 40.

The optical coupling means 50 also has an optical coupling section 53 for multiplexing the laser for processing and pump lights, which propagated the optical fibers 51 and 52, and an optical fiber 54 for outputting the laser beam for processing and pump lights which passed through the optical coupling section 53 to the optical amplification fiber 20. In the present embodiment, the optical fiber 54 functions as an output port for outputting the laser beam for processing and the pump light to the optical amplification fiber 20. The optical fiber 54 is optically connected to an edge section 20a of the optical amplification fiber 20, and propagates the laser beam for processing, and inputs it to the core area 20A of the optical amplification fiber 20, and propagates the pump lights in multi-transverse-mode and inputs them to the core area 20A and the clad area 20B. It is preferable that the optical fiber 54 is a double clad type fiber. However, the optical fiber 54 is sufficient if it can propagate the laser beam for processing and can propagate the pump lights in multi-transverse-mode, and input them to the optical amplification fiber 20, as mentioned above, so critical here is having the core area for propagating the laser beam for processing in single mode and the first clad area for propagating the pump lights in multi-transverse-mode.

Figure 3:
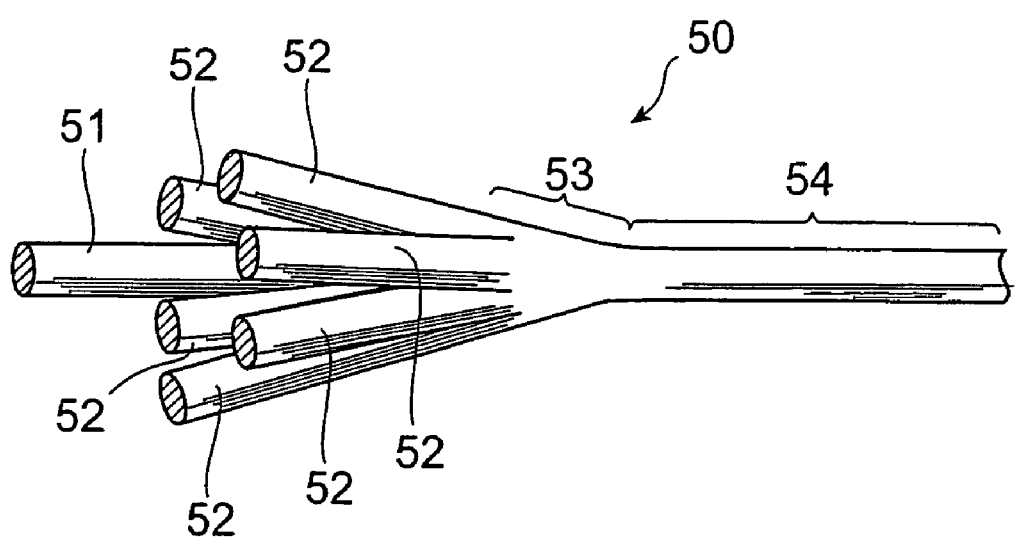
FIG. 3 is a perspective view depicting an example of a concrete configuration of the optical coupling means shown in FIG. 1.

An example of a concrete configuration of the optical coupling means 50 is where the optical fiber 51 and the optical fibers 52 are tapered and integrated, as shown in FIG. 3 (e.g. Japanese Patent No. 3415449). In the case of the optical coupling means 50 shown in FIG. 3, the tapered portion where the optical fiber 51 and the optical fibers 52 are combined, is the optical coupling section 53, and the optical fiber 54 is optically connected to the optical coupling section 53. If the optical coupling section is extended from the tapered portion to be a predetermined diameter, and the optical amplification fiber 20 has a portion where the laser beam for processing and the pump lights can be input, the optical fiber 54 is unnecessary.

The optical module 31 shown in FIG. 1 has a plurality of pump light sources 40, but the number of pump light sources 40 can be adjusted according to the power of the pump lights to be supplied to the optical amplification fiber 20, and can be one if the pump light source 40 is high powered. The number of pump light sources 40 and the number of optical fibers 52 match here, but if the number of optical fibers 52 is more than the number of pump light sources 40, the edges of the optical fibers 52 which are not used can be termination-processed so that light is not reflected.

Now the optical guide section 60 which is a characteristic of the optical module 31 will be described. The optical guide section 60 is comprised of a first optical fiber for guiding 61 and a second optical fiber for guiding 62 for propagating the pump light in multi-transverse-mode which are optically connected. The first and second optical fibers for guiding 61 and 62 are sufficient if they are optically connected, so they may be connected by fusion or connected by a connector.

Figure 4:
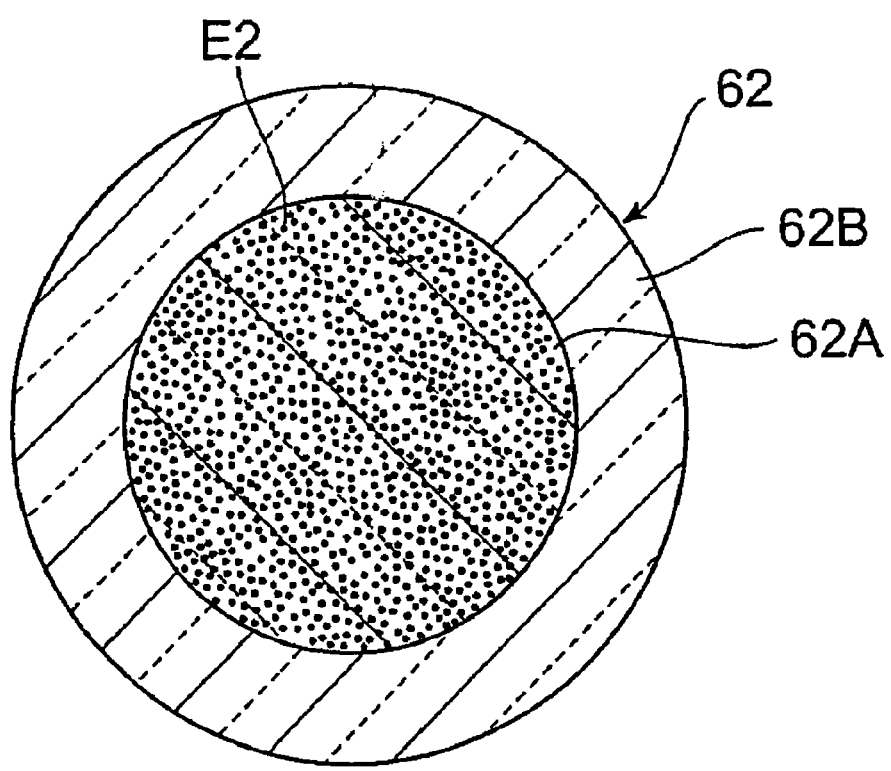
FIG. 4 is a cross-sectional view depicting a second optical fiber for guiding sectioned perpendicular to the longitudinal direction.

FIG. 4 is a cross-sectional view depicting the second optical fiber for guiding, and is sectioned perpendicular to the longitudinal direction. The second optical fiber for guiding 62 is comprised of a core area (first core area) 62A, and a clad area (first clad area) 62B which is formed in the outer circumference of the core area 62A, and has a refractive index lower than a refractive index of the core area 62A, and propagates the pump lights in multi-transverse-mode in the core area 62A. An example of the diameter of the core area 62A is 100 µm, and an example of the diameter of the clad area 62B is 125 µm. A rare earth element (hereafter called "element for optical absorption") E2 is added to the core area 62A. The element for optical absorption E2 functions as a loss medium which has a transmission loss that is greater in a wavelength of the laser beam for processing than in a wavelength of the pump light. Because of this, the second optical fiber for guiding 62 has high transmittance to pump light, and has low transmittance to a laser beam for processing.

The configuration of the first optical fiber for guiding 61 is the same as the second optical fiber for guiding 62, except that the element for optical absorption E2 is not added to the core area.

In the optical module 31, the pump light sources 40 are optically connected to the first optical fiber for guiding 61, and the optical fibers 52 are optically connected to the second optical fiber for guiding 62. By this, the pump lights are propagated through the optical guide section 60 in multi-transverse-mode from the pump light sources 40, and are input to the optical coupling means 50.

Figure 5:
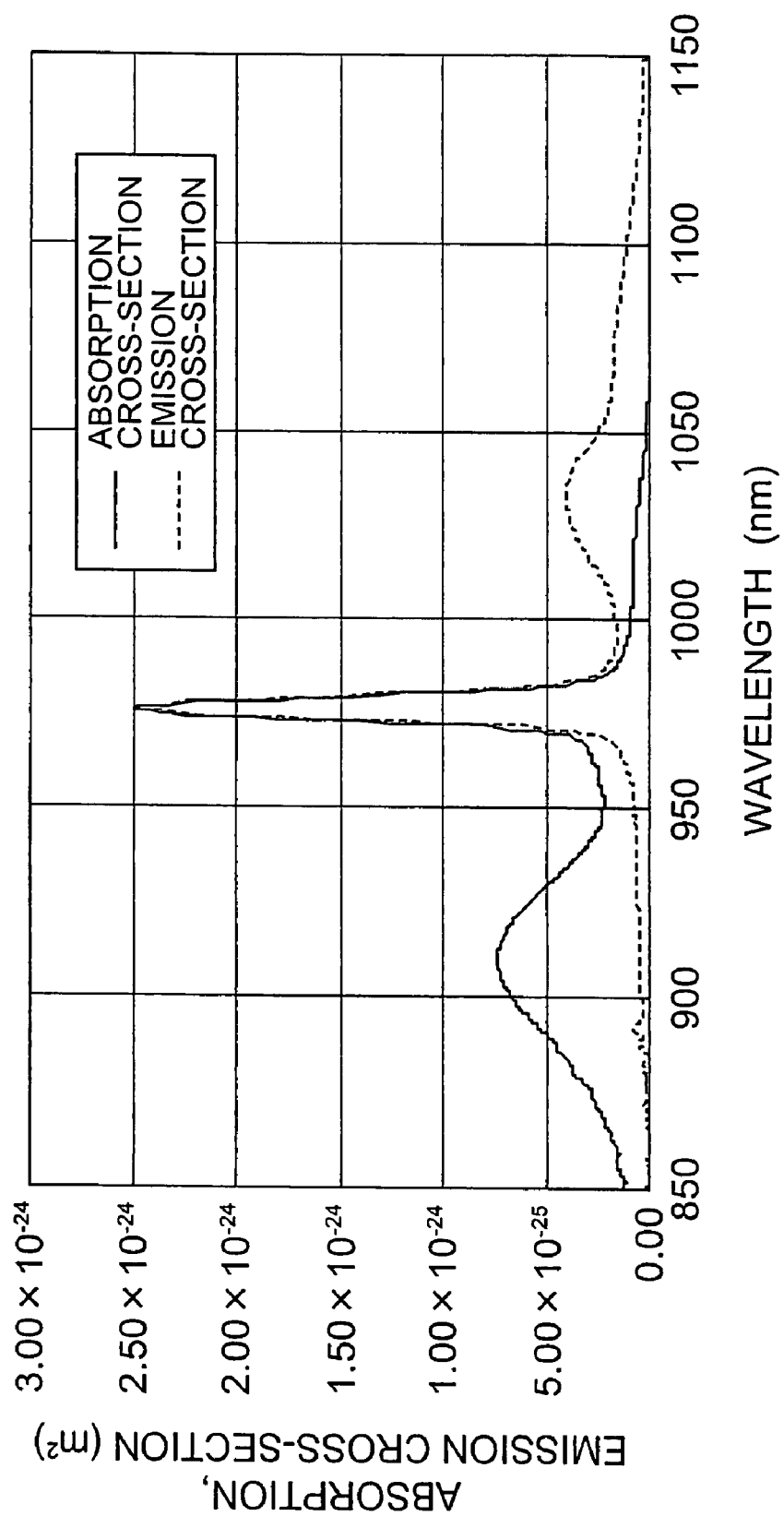
FIG. 5 is a graph depicting the absorption and emission characteristics of Yb.

Now the operation of the optical amplification module 1 will be described. In an example, it is assumed that the wavelength $\lambda_A$ of the laser beam for processing is about 1060 nm, and the wavelength $\lambda_P$ of the pump light is about 974 nm. The element for optical amplification E1, which was added to the optical amplification fiber 20, is assumed to be rare earth element Yb as an example. FIG. 5 is a graph depicting the absorption and emission characteristics of Yb. As FIG. 5 shows, Yb absorbs lots of light in a wavelength of about a 915 nm band (915 nm±30 nm) and a 974 nm band (974 nm±10 nm), and these two wavelength bands are frequently used for amplification medium where Yb is added. Here the wavelength 974 nm band having a large absorption coefficient is used as the excitation LD as an example, but even if the wavelength 915 nm band is used as the excitation LD, the wavelength band to be amplified is the same, so the functions and effects of the optical module 31 to be described later are still the same. If Yb is excited in one of the above two wavelength bands, the amplification band is 1020 to 1080 nm, as shown in FIG. 5, and in this example, the light of 1060 nm was used. As FIG. 5 shows, there is an obvious difference between the pump light wavelength and the wavelength band of the to-be-amplified light, and if the functions and effects of the optical module 31, to which a medium of which absorption coefficient is different between the pump light wavelength and the to-be-amplified light wavelength is included, are considered, the functions and effects of the optical module 31 become the same if the wavelength of the laser beam for processing is set between 1020 to 1080 nm.

Figure 6:
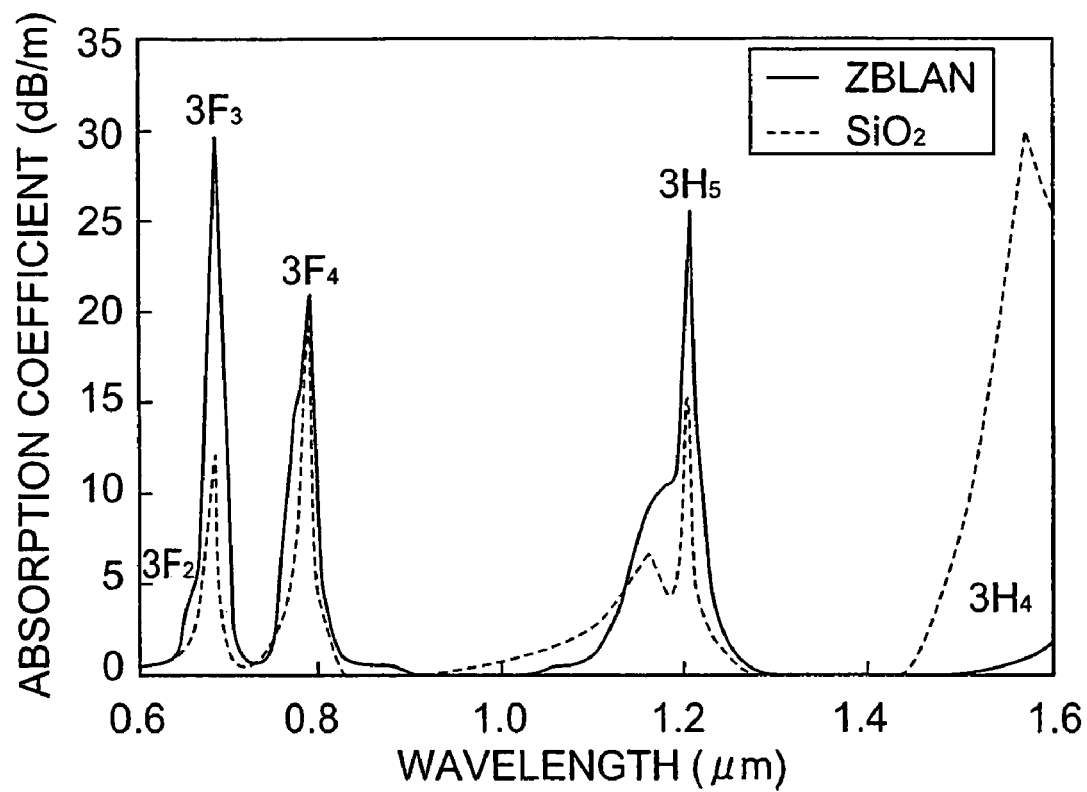
FIG. 6 is a graph depicting the absorption characteristic of Tm.

In this example, the element for optical absorption 12 added to the core area 62A is rare earth element Tm. FIG. 6 shows the absorption characteristics of Tm (see "Tetsuro Komukai, et al: "Up conversion Pumped Thulium-Doped Fluoride Fiber Amplifier and Laser Operating at 1.47 µm", IEEE Journal of Quantum Electronics, November 1995, Vol. 31, No. 11, pp, 1880-1889). As FIG. 6 shows, in the case of Tm, the absorption coefficient is small for light having a wavelength of about 974 nm, and the absorption coefficient is large for light having a wavelength of about 1060 nm. In other words, Tm, as the element for optical absorption E2, has a characteristic of mainly absorbing the laser beam for processing rather than the pump light, and as a result, a greater transmission loss is generated by Tm for the laser light for processing.

If each pump light source 40 outputs the pump light having a wavelength of about 974 nm in the optical amplification module 1 under the above mentioned conditions, the pump light is input to the optical guide section 60, and propagates in multi-transverse-mode in the optical guide section 60 and is input to the optical coupling means 50. In the core area 62A of the second optical fiber for guiding 62 constituting the optical guide section 60, Tm is added as the element for optical absorption E2, but as shown in FIG. 6, Tm absorbs little light having a wavelength of about 974 nm, so pump light is input to the optical coupling means 50 with certainty. The pump light, which is input to the optical coupling means 50, is input to the optical amplification fiber 20, and propagates toward the edge section 20b while exciting Yb, which is the element for optical amplification E1 added to the core area 20A.

When the light source 10 outputs the laser beam for processing having a wavelength of about 1060 nm, the laser beam for processing propagates through the optical fiber 51 in single mode, is input to the optical amplification fiber 20 via the optical coupling means 50, then propagates through the core area 20A of the optical amplification fiber 20 toward the edge section 20b.

At this time, if Yb, which is the element for optical amplification E1 added to the core area 20A, as described above, is being excited by the pump light, then induced emission is generated by the laser beam for processing, and the laser beam for processing is optically amplified. Therefore the optically amplified laser beam for processing having high power is output from the edge section 20b of the optical amplification fiber 20.

In the optical module 31 of the optical amplification module 1, it is important that the optical coupling means 50 and the pump light source 40 are connected by the optical guide section 60. The functions and effects of the disposing the optical guide section 60 having the element for optical absorption E2 as the loss medium between the optical coupling means 50 and the pump light source 40 will be described in comparison with the optical amplification module 130 to which the optical module 140 for comparison shown in FIG. 7 is applied.

Figure 7:
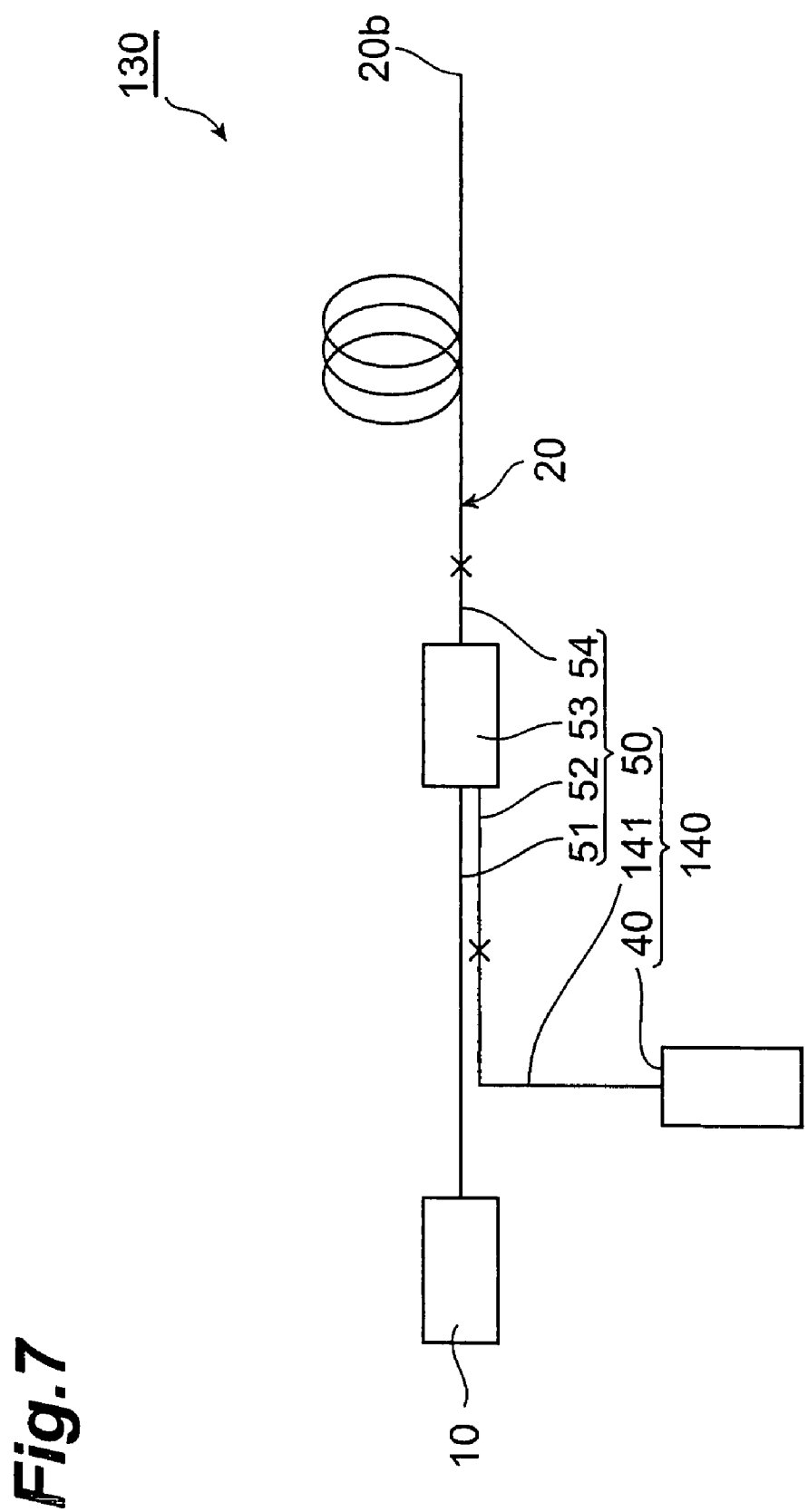
FIG. 7 is a block diagram depicting a configuration of an optical amplification module for comparison.

The difference of the configuration of the optical module 140 shown in FIG. 7 from the configuration of the optical module 31 is that the optical fiber 52 and the pump light sources 40 of the optical coupling means 50 and the pump light source 40 are optically connected with an optical fiber 141 to which the element for optical absorption E2 is not added. In the following description, it is assumed that the optical fiber 141 has a configuration the same as the configuration of the first optical fiber for guiding 61, and propagates the pump lights in multi-transverse-mode. In FIG. 7, only one pump light source 40 is shown to simplify description.

In the optical amplification module 130 as well, the laser beam for processing and the pump lights are supplied to the optical amplification fiber 20 by the optical coupling means 50, and the laser beam for processing is optically amplified by the optical amplification fiber 20, and is then output from the edge section 20b as a high power laser beam for processing.

When the edge section 20b of the optical amplification fiber 20 is connected with another optical fiber, a connection loss is generated in the connected portion due to an MFD mismatch or axis shift, and in some cases, the high power laser beam for processing for the amount of loss may enter the first clad area 20B in the optical amplification fiber 20 as a return light. Also if the optical amplification module 130 is applied to the optical processing system, as mentioned above, the high power laser beam for processing, which is output from the edge section 20b, may enter the first clad area 20B as return light due to other optical elements (lens, mirrors) of the optical processing system. In such cases, a laser beam for processing, which propagates through the propagation area of the pump light toward the pump light source 40, may possibly exist.

In the optical amplification module 130, the pump light source 40 and the optical coupling means 50 are connected via the optical fiber 141 which propagates light in multi-transverse-mode, as described above, so even if an isolator or fiber grating, for example, which is effective for adjusting the propagation direction of light propagating in single mode is formed in the optical fiber 141, the high power laser beam for processing, which propagates toward the pump light source 40, in some cases may not be able to be cut. As a result, the high power laser beam for processing may reach the pump light source 40, the pump light source 40 may be damaged or operation thereof may become unstable, and as a result, a high power laser beam for processing may not be able to be stably output.

In the case of the optical module 31 of the above mentioned optical amplification module 1, on the other hand, the optical coupling means 50 and the pump light source 40 are connected by the optical guide section 60 having the second optical fiber for guiding 62 to which the element for optical absorption E2 is added. Therefore even if the laser beam for processing propagates from the optical amplification fiber 20 toward the pump light source 40 via the optical coupling means 50, a large transmission loss is generated to the laser beam for processing because of the element for optical absorption E2 when the laser beam for processing passes through the second optical fiber for guiding 62. As a result, the laser beam for processing, as a return light, does not reach the pump light source 40 with an intensity high enough to destroy the execution light source 40. In other words, the second optical fiber for guiding 62, to which the element for optical absorption E2 is added, functions as a protective medium for the pump light source 40. As described above, in the optical module 31, the second optical fiber for guiding 62 is formed between the pump light source 40 and the optical coupling means 50 as an pump light source protective medium, so the laser beam for processing as a return light does not damage the pump light source 40 or cause unstable operation. Therefore the optical module 31 can stably supply the pump light to the optical amplification fiber 20, and as a result, the laser beam for processing can be stably output from the edge section 20b.

The pump light, which is output from each pump light source 40, is propagated in multi-transverse-mode using the optical guide section 60, so more pump lights can be supplied by the optical amplification fiber 20 compared with the case of using optical fiber for propagating the pump light in single mode. Since the laser beam for processing can be efficiently amplified, a laser beam for processing having further higher power can be output. As a result, in the optical amplification module 1, a high intensity laser beam for processing can be stably output from the edge section 20b.

As mentioned above, the element for optical absorption E2 is for preventing a laser beam for processing as a return light from reaching the pump light source 40 and damaging the pump light source 40. Therefore the element for optical absorption E2 to be added to the second optical fiber for guiding 62 is sufficient if it can suppress the transmission of the laser beam for processing, so that the pump light source 40 is not damaged and the operation thereof does not become unstable, and can propagate the pump light.

Second Embodiment

Figure 8:
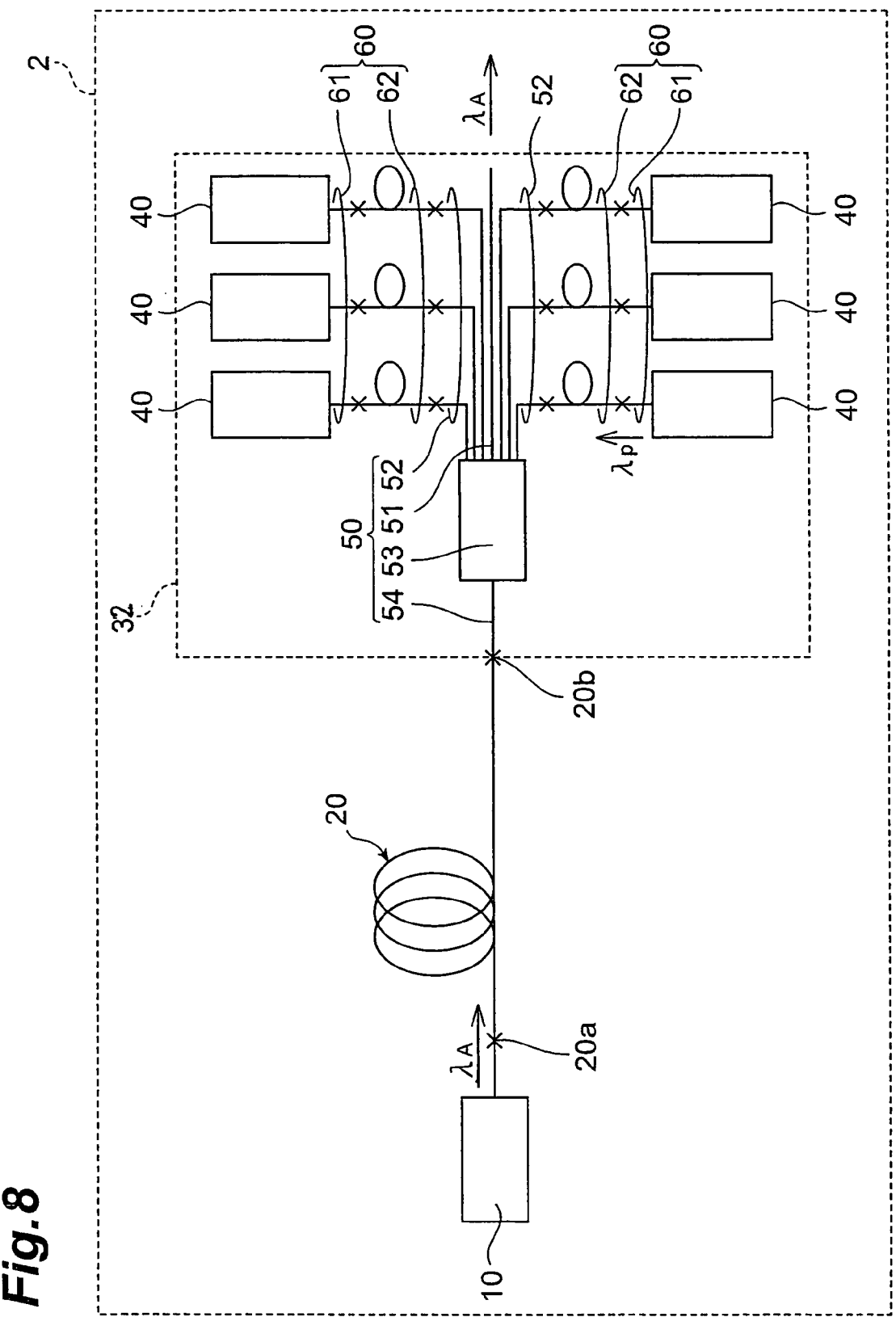
FIG. 8 is a block diagram depicting a configuration of another embodiment of the optical amplification module shown in FIG. 1.

FIG. 8 is a block diagram depicting a configuration of another embodiment of the optical amplification module. The optical amplification module 2 is a back-excitation type optical amplification module.

In the optical amplification module 2, a light source 10 with a single mode fiber or a LMA (Large Mode Area) fiber is optically connected to an edge section 20a of an optical amplification fiber 20, and a laser beam for processing, which is output from the light source 10, propagates through the optical amplification fiber from the edge section 20a to an edge section 20b. An optical module 32 is optically connected to the edge section 20b of the optical amplification fiber 20.

Just like the optical module 31 of the first embodiment, the optical module 32 comprises pump light sources 40 and optical coupling means 50, which are optically connected via the optical guide sections 60. In the present embodiment, an optical fiber 54 of the optical coupling means 50 is connected to the edge section 20b of the optical amplification fiber 20, and the optical fiber 54 functions as an input port (first input port) of the laser beam for processing, and also functions as an output port for the pump lights. The optical fiber 51 functions as an output port. The optical fiber 52 are connected to the optical guide section 60, and function as input port (second input ports) of the pump lights which are output from the pump light sources 40.

Now the operation of the optical amplification module 2 will be described. Just like the case of the first embodiment, the pump light, which is output from each pump light source 40, is input to the optical amplification fiber 20 via the optical guide section 60 and the optical coupling means 50. Then the pump light, which is input to the optical amplification fiber 20, excites the element for optical amplification E1 while propagating toward the edge section 20a. The laser beam for processing, which is output from the light source 10, is input from the edge section 20a to the optical amplification fiber 20, and propagates through the optical amplification fiber 20 toward the optical coupling means 50.

If the laser beam for processing is input from the light source 10 to the optical amplification fiber 20 in a state where the element for optical amplification E1 is being excited, an induced emission is generated and the laser beam for processing is optically amplified. The optically amplified laser beam for processing is input to the optical fiber 51 via the optical fiber 54 and the optical coupling section 53, and is then output from the edge section of the optical fiber 51. As a result, a high power laser beam for processing is output from the optical fiber 51.

In the case of the optical module 32 of the optical amplification module 2 as well, the optical guide section 60 is formed between the pump light sources 40 and the optical coupling means 50. Therefore, even if the laser beam for processing enters the first clad area of the optical fiber 54 due to an MFD mismatch or axis shift in the connected portion between the optical amplification fiber 20 and the optical coupling means 50, and the laser beam for processing propagates toward the pump light sources 40 in a direction opposite from the propagation direction of the pump lights, a large transmission loss is generated in the laser beam for processing by the element for optical absorption E2 when the laser beam for processing passes through the second optical fiber for guiding 62. This suppresses reaching the laser beam for processing for an amount of loss generated by the connection loss to the pump light source 40. Since the pump light source 40 is not damaged or become unstable by the high power laser for processing, a high power laser beam for processing can be stably output.

Just like the case of the first embodiment, the optical module 32 has a plurality of pump light sources 40, but may have only one pump light source 40.

Third Embodiment

Figure 9:
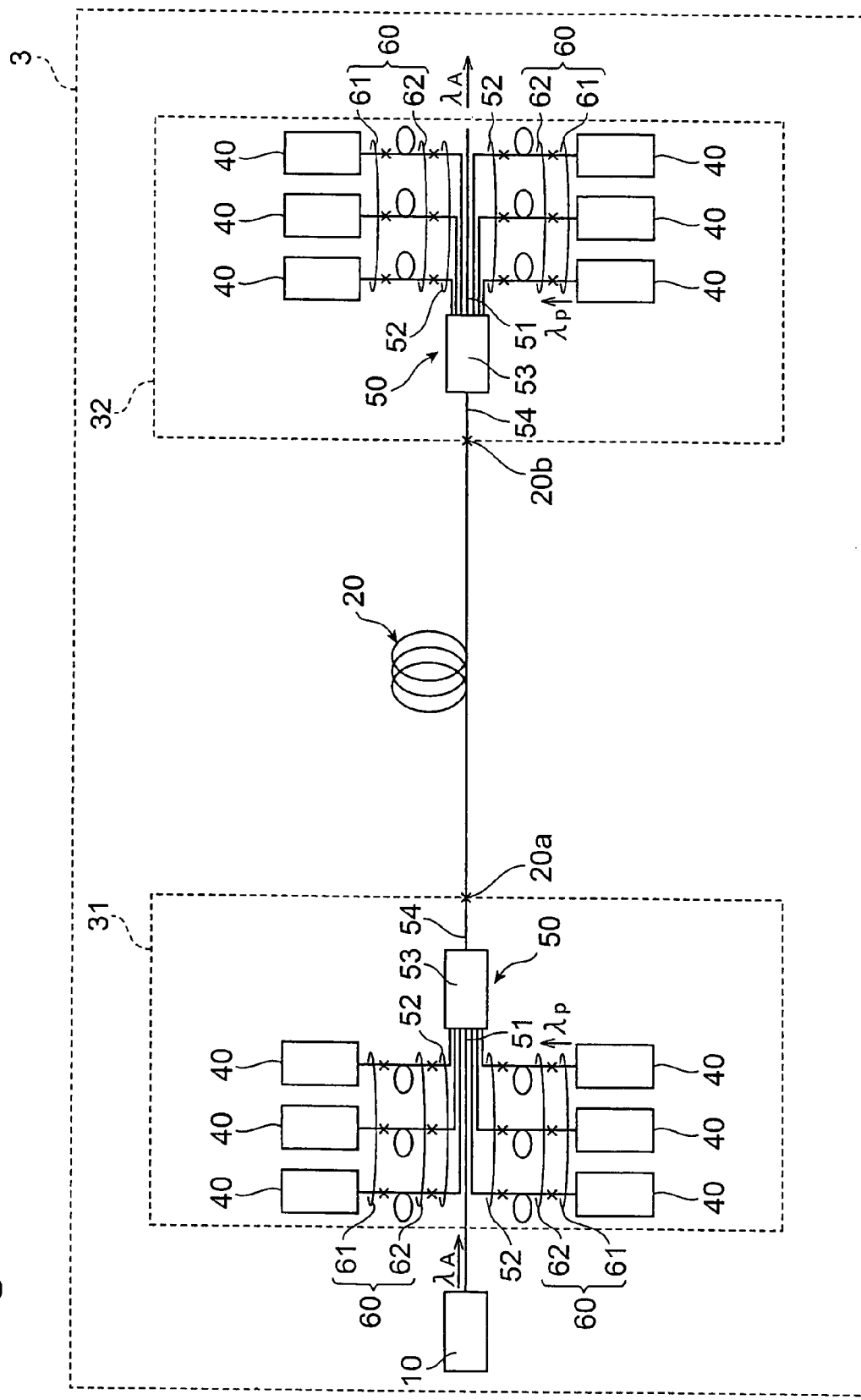
FIG. 9 is a block diagram depicting a configuration of still another embodiment of the optical amplification module shown in FIG. 1.

FIG. 9 is a block diagram depicting a configuration of another embodiment of the optical amplification module. The optical amplification module 3 is a bidirectional excitation type optical amplification module.

In the optical amplification module 3, an optical module 31 is optically connected to an edge section 20a of an optical amplification fiber 20, just like the case of the first embodiment, and an optical module 32 is optically connected to an edge section 20b, just like the case of the second embodiment. A light source 10 is optically connected to an optical fiber 51 of the optical module 31 just like the case of the first embodiment.

In this configuration, pump lights from pump light sources 40 of each optical module 31 and 32 are input to an optical amplification fiber 20 respectively from the edge sections 20a and 20b, and propagate through the optical amplification fiber 20 and excite the element for optical amplification E1. If a laser beam for processing, which is output from the light source 10, is input to the optical amplification fiber 20 via the optical module 31 when the element for optical amplification E1 is being excited like this, the laser beam for processing is optically amplified. Then just like the case of the second embodiment, the optically amplified laser beam for processing is input to the optical fiber 54 via the optical coupling means 50 connected to the edge section 20b, and is output from the edge section of the optical fiber 51.

In this case as well, the pump lights are supplied to the optical amplification fiber 20 using each optical modules 31 and 32, so a high power laser beam for processing does not enter the pump light sources 40, just like the cases of the optical amplification modules 1 and 2 of the first and second embodiments. As a result, a high power laser beam for processing can be stably generated.

Fourth Embodiment

Figure 10:
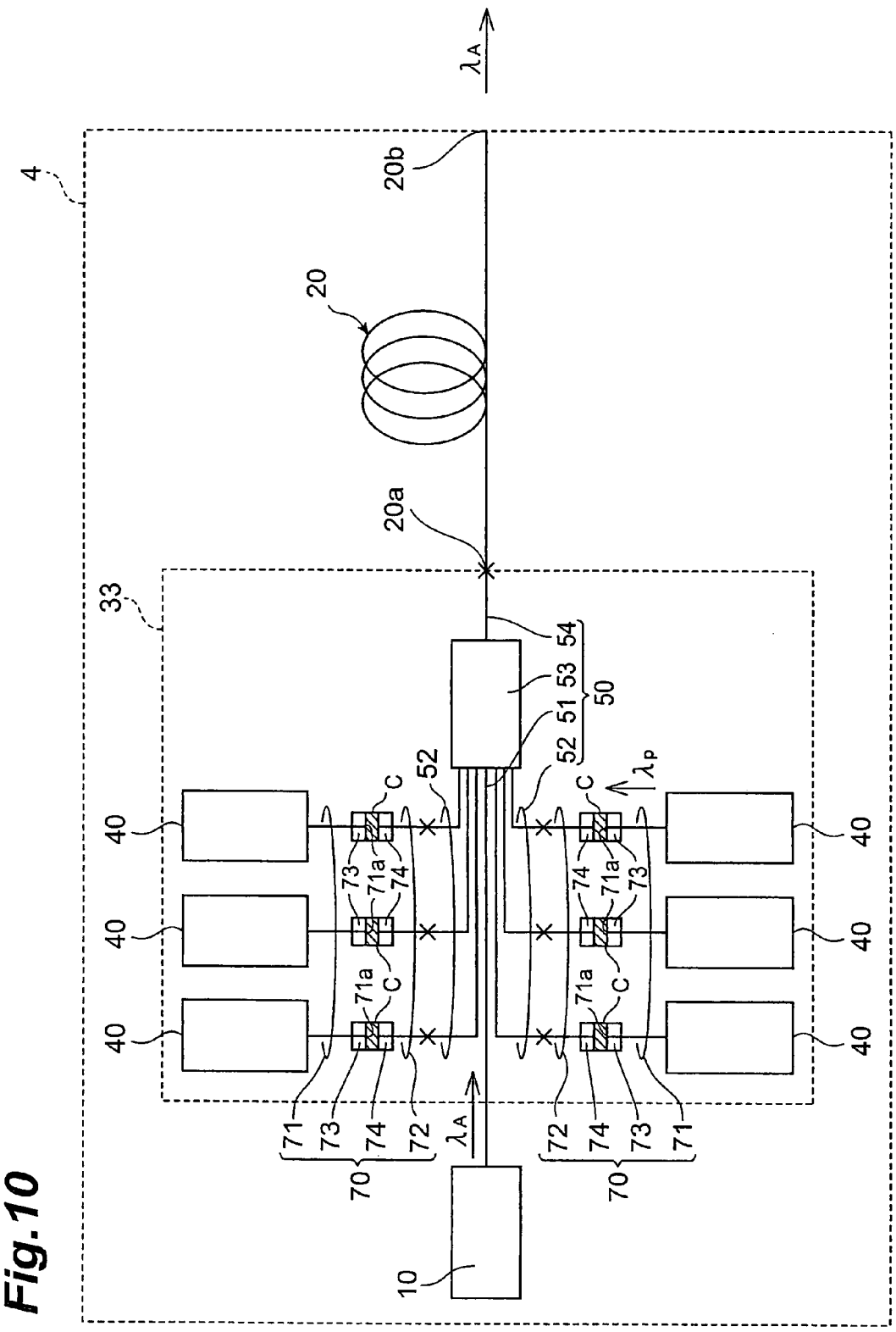
FIG. 10 is a block diagram depicting a configuration of an optical amplification module to which another embodiment of the optical module according to the present invention is applied.

FIG. 10 is a block diagram depicting a configuration of still another embodiment of the optical amplification module.

The optical amplification module 4 is comprised of a light source 10 and an optical amplification fiber 20 which are connected by an optical module 33. A major difference of the configuration of the optical module 33 from the configuration of the optical module 31 is that the pump light sources 40 and the optical coupling means 50 are optically connected by the optical guide sections 70. This point will be the focus of the following description.

An optical guide section 70 has first and second optical fibers for guiding 71 and 72. The first and second optical fiber for guiding 71 and 72 has a core area and a clad area similar to those of the first optical fiber for guiding 61, and propagates pump lights which are output from the pump light sources 40 in multi-transverse-mode.

The first optical fiber for guiding 71 is an optical fiber with a connector, of which optical connector 73 is connected to the edge section at the opposite side of the pump light source 40. In the optical module 33, a loss medium C is formed on a ferrule end face of the optical connector 73 as a coating, and as a result, the loss medium C is formed as the fiber end face 71a of the first optical fiber for guiding 71. The loss medium C is for generating a transmission loss which is greater in a wavelength of the laser beam for processing than in a wavelength of the pump light. The loss medium C is, for example, a dielectric multilayer film, such as $SiO_2$, $TiO_2$, $ZrO_2$ and $Ta_2O_5$, such a metal film as Al and Au, or a rare earth element. In FIG. 10, the loss medium C is schematically shown.

In the optical guide section 70, the second optical fiber for guiding 72 is also an optical fiber with a connector where the optical connector 74 is connected to the edge section. By connecting the optical connectors 73 and 74, the first and second optical fibers for guiding 71 and 72 are optically connected and constitute the optical guide section 70. Therefore a loss medium C is disposed between the first and second optical fibers for guiding 71 and 72.

The operation of the optical amplification module 4 is the same as the operation of the optical amplification module 1. In other words, pump lights, which are output from the pump light sources 40, are input to the optical amplification fiber 20 via the optical guide section 70 and the optical coupling means 50. By this, the element for optical amplification E1 added to the optical amplification fiber 20 is excited. The laser beam for processing, which is output from the light source 10, is input to the optical amplification fiber 20 via the optical module 33.

If the element for optical amplification E1 is being excited by the pump lights when the laser beam for processing is input to the optical amplification fiber 20, an induced emission is generated and the laser beam for processing is optically amplified. This optically amplified laser beam for processing is output from the edge section 20b, so a high power laser beam for processing is output from the optical amplification module 4.

In the optical module 33 of the optical amplification module 4 as well, the loss medium C is formed between the pump light source 40 and the optical coupling means 50. Therefore even if the laser beam for processing propagates toward the pump light source 40 due to an MFD mismatch or axis shift in the connected portion between the optical amplification fiber 20 and another optical fiber, a large transmission loss is generated in the laser beam for processing when the laser beam for processing passes through the loss medium C disposed between the optical fiber for guiding 70 and the optical fiber 52. As a result, the reaching of the laser beam for processing for the amount of loss generated by a connection loss to the pump light source 40 can be suppressed. Since the loss medium C functions as a protective medium of the pump light source 40, the pump light source 40 is not damaged or become unstable by the high power laser beam for processing, and a high power laser beam for processing can be stably output.

The connection method for the first and second optical fibers for guiding 71 and 72 is not especially limited only if the loss medium C is formed at the connected portion, and the first and second optical fibers for guiding 71 and 72 are optically connected such that the pump light from the pump light source 40 can be input to the optical coupling means 50 with certainty. For example, a V-shaped groove may be used for the connection. The method for disposing the loss medium C can be anything if the loss medium C can be disposed at the connected portion of the first and second optical fibers for guiding 71 and 72. For example, the loss medium C can be formed on at least one of fiber end face 71a of the first optical fiber for guiding 71 and fiber end face 72a of the second optical fiber for guiding 72.

Figure 11:
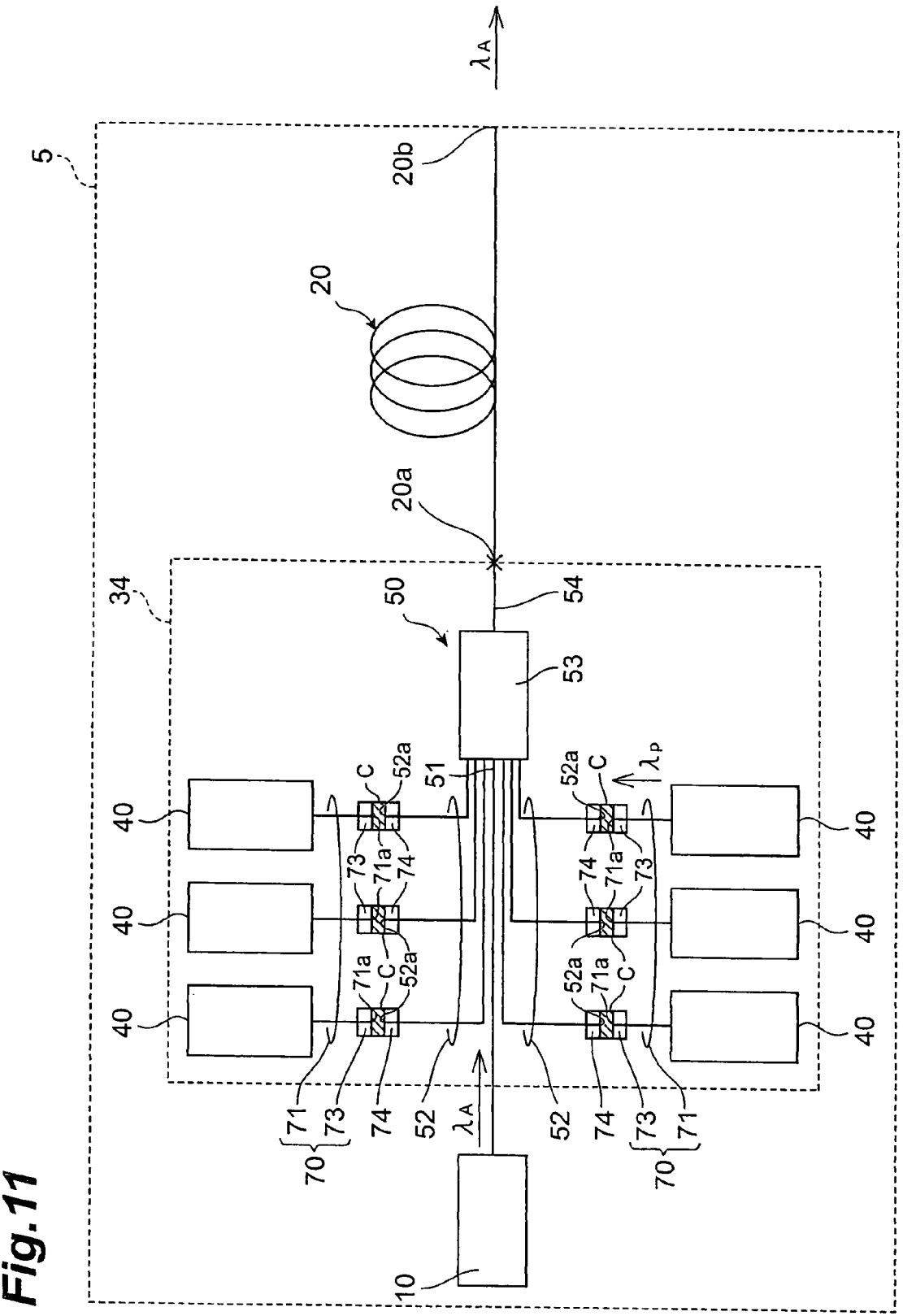
FIG. 11 is a block diagram depicting a configuration of an optical amplification module to which still another embodiment of the optical module according to the present invention is applied.

The optical guide section 70 may be one not having the second optical fiber for guiding 72, as shown in FIG. 11.

In the case of an optical module 34 of an optical amplification module 5 shown in FIG. 11, an optical guide section 70 is comprised of a first optical fiber for guiding 71 to which an optical connector 73 is connected, and a loss medium C is disposed on a fiber end face 71a by forming the loss medium C on a ferrule end face of the optical connector 73. Also in the optical module 34, an optical connector 74 is connected to an edge section of an optical fiber 52 of the optical coupling means 50. The first optical fiber for guiding 71 and the optical coupling means 50 are optically connected by connecting the first optical fiber for guiding 71 and the optical fiber 52 using the optical connectors 73 and 74.

As mentioned above, the loss medium C is formed on the ferrule end face of the optical connector 73, so the loss medium C is disposed between the end faces 71a and 52a where the optical guide section 70 and the optical coupling means 50 are connected. As a result, just like the case of the optical module 33 shown in FIG. 10, the pump light source 40 is not damaged or does not perform unstable operation by the high power laser for processing.

In the optical module 34, although the loss medium C is formed on the fiber end face 71a of the first optical fiber for guiding 71, the only requirement is that the loss medium C is disposed between the optical guide section 70 and the optical coupling means 50, so the loss medium C may be formed on the fiber end face 52a of the optical fiber 52 constituting one end face of the optical coupling means 50. The connection method for the first optical fiber for guiding 71 and the optical fiber 52 is not especially limited only if the first optical fiber for guiding 71 and the optical fiber 52 can be optically connected so that the loss medium C is disposed there between, and a V-shaped groove may be used, as mentioned above.

Fifth Embodiment

Figure 12:
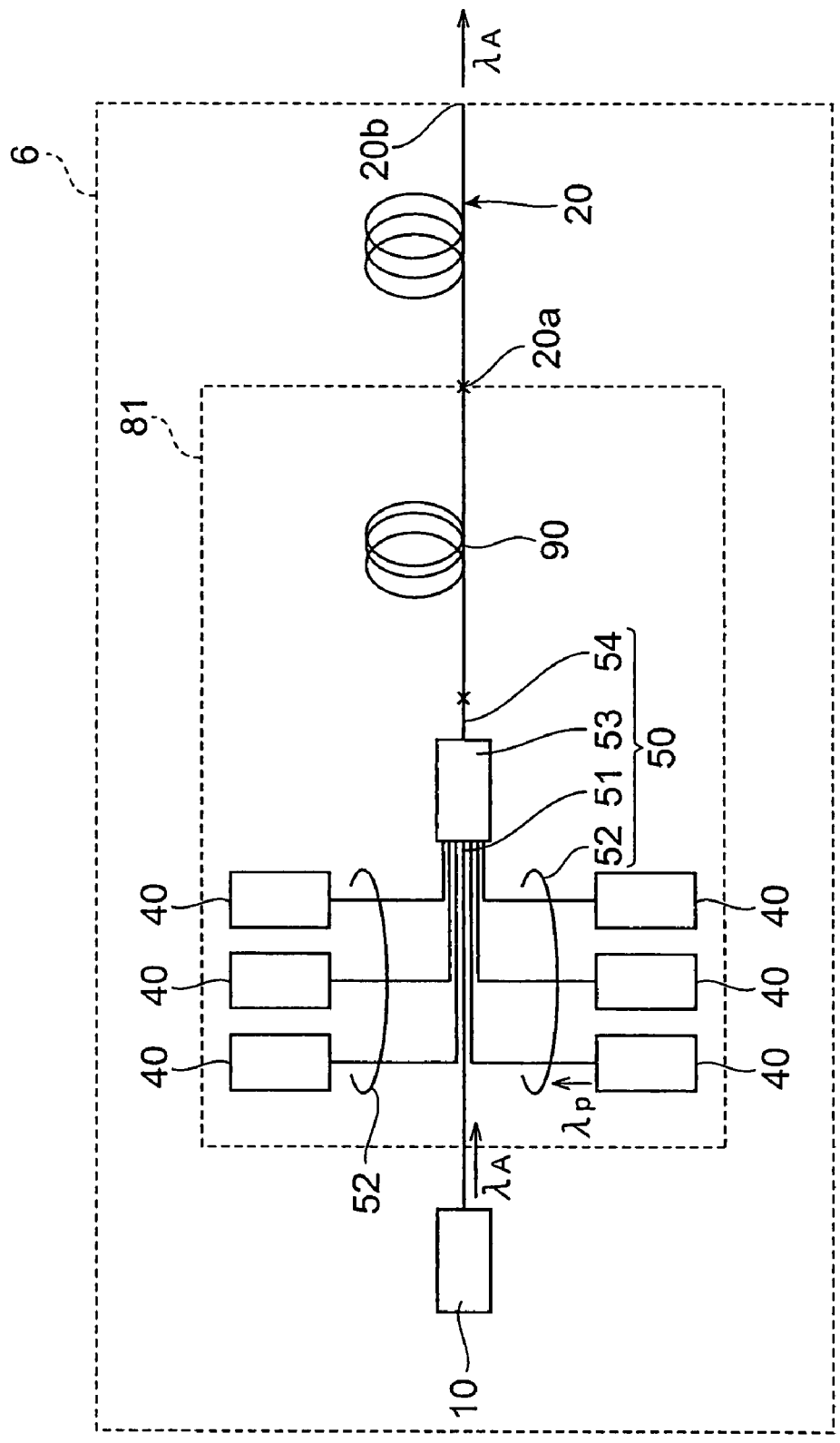
FIG. 12 is a block diagram depicting a configuration of an optical amplification module to which still another embodiment of the optical module according to the present invention is applied.

FIG. 12 is a block diagram depicting a configuration of an optical amplification module according to the fifth embodiment. The optical amplification module 6 is used as a fiber laser light source in an optical processing system, to which an embodiment of the optical module according to the present invention is applied.

The optical amplification module 6 comprises a light source 10, an optical amplification fiber 20, and an optical module 81 for supplying a laser bean for processing and pump lights to the optical amplification fiber 20. The light source 10 is a laser diode (LD), for example. The configurations of the light source 10 and the optical amplification fiber 20 are the same as those of the first embodiment, so description thereof is omitted.

As FIG. 12 shows, the optical module 81 has a plurality (six in the case of FIG. 12) of pump light sources 40 and optical coupling means 50, just like the optical module 31 of the first embodiment, and also has an optical fiber for guiding 90 which connects the optical coupling means 50 and the optical amplification fiber 20, and the pump light sources 40 and the optical fiber for guiding 90 are optically connected by the optical coupling means 50.

The optical coupling means 50 has an optical fiber 51 and a plurality of optical fibers 52, just like the case of the first embodiment. The light source 10 is connected to the optical fiber 51, and the optical fiber 51 functions as an input port of a laser beam for processing which is output from the light source 10. The pump light sources 40 are connected to the optical fibers 52, and the optical fibers 52 function as input ports of the pump lights which are output from the pump light sources 40.

The optical coupling means 50 also has an optical coupling section 53, which is used for multiplexing the laser beam for processing and the pump lights, which propagated through the optical fibers 51 and 52, and an optical fiber 54, which is used for inputting the laser beam for processing and the pump lights, which passed through the optical coupling section 53 to the optical fiber for guiding 90.

In the present embodiment, the optical fiber 54 is optically connected to the optical fiber for guiding 90, so that the laser beam for processing is propagated and is input to a core area (first core area) 90A of the optical fiber for guiding 90, which is mentioned later, and the pump lights are propagated in multi-transverse-mode, and input to the core area 90A and a clad area (first clad area) 90B. Critical for optical fiber 54 is propagating the laser beam for processing and propagating the pump lights in multi-transverse-mode, and inputting them to the optical fiber for guiding 90, so it is sufficient if the optical fiber 54 has the core area for propagating the laser beam for processing and the first clad area for propagating the pump lights in multi-transverse-mode. If the optical fibers are optically interconnected, just like the case of optically connecting the optical fiber 54 and the optical fiber for guiding 90, a fusion connection may be used or a connector-connection may be used.

The optical module 81 shown in FIG. 12 has a plurality of pump light sources 40, but just like the case of the first embodiment, the number of pump light sources 40 can be adjusted according to the power of the pump light to be supplied to the optical amplification fiber 20, and only one pump light source 40 may be used if the pump light source 40 has high power. The number of the pump light sources 40 and the number of the optical fibers 52 are matched here, but if the number of the optical fibers 52 is greater than the number of the pump light sources 40, for example, the edge sections of the optical fibers 41 which are not in use can be termination-processed so that light is not reflected.

Figure 13:
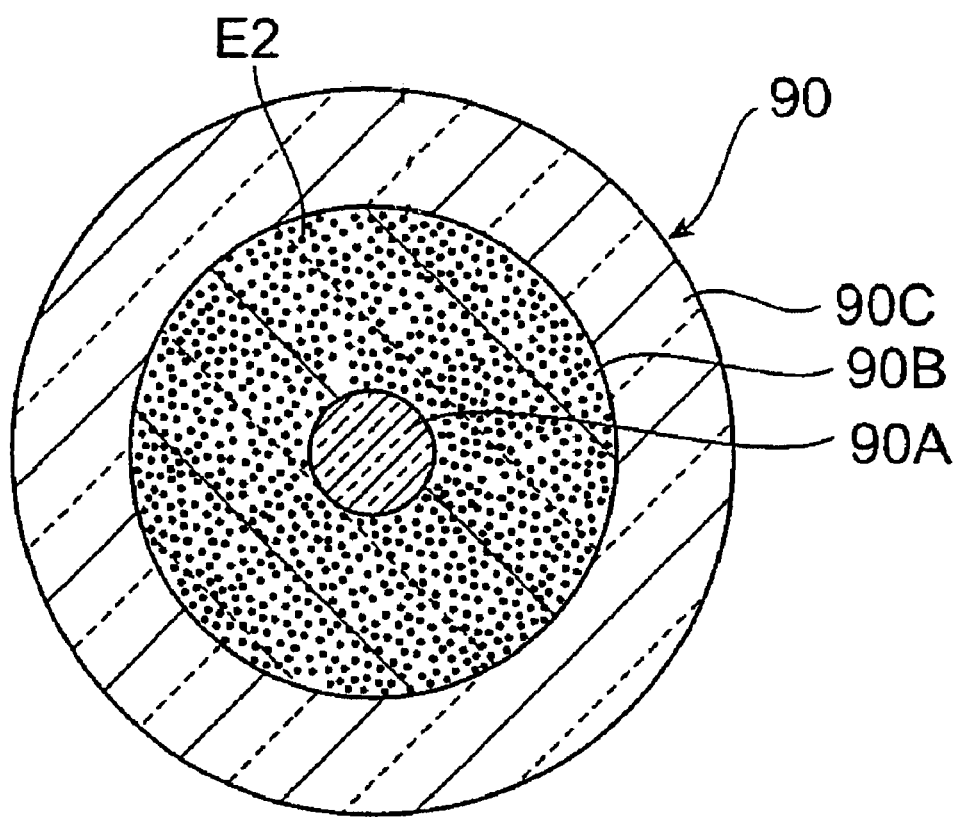
FIG. 13 is a cross-sectional view depicting the optical fiber for guiding shown in FIG. 12 sectioned perpendicular to the longitudinal direction.

As FIG. 13 shows, the optical fiber for guiding 90 is a double clad type optical fiber, of which major component is $SiO_2$, comprised of the core area (first core area) 90A, the clad area (first clad area) 90B formed in an outer circumference of the core area 90A, and a clad area (second clad area) 90C formed in an outer circumference of the clad area 90B. FIG. 13 is a cross-sectional view depicting the optical fiber for guiding, which is sectioned perpendicular to the longitudinal direction.

A rare earth element (hereafter called "element for optical absorption") E2 having a transmission loss which is greater in a wavelength $\lambda_A$ of the laser beam for processing than a wavelength $\lambda_P$ of the pump light has been added to the clad area 90B. In FIG. 13, the element for optical absorption E2 is schematically shown. The element for optical amplification E1 may be added to the core area 90A, just like the case of the optical amplification fiber 20.

The greater/smaller relationship of the refractive indexes of the core area 90A, clad area 90B and clad area 90C of the optical fiber for guiding 90 is the same as the case of the optical amplification fiber 20, and in the optical fiber for guiding 90 as well, the laser beam for processing is propagated in the core area 90A, and pump lights are propagated in multi-transverse-mode in the core area 90A and clad area 90B.

Now the operation of the optical amplification module 6 will be described. In this example, it is assumed that the wavelength $\lambda_A$ of the laser beam for processing is about 1060 nm and the wavelength $\lambda_P$ of the pump light is about 974 nm. The element for optical amplification E1 added to the optical amplification fiber 20 is assumed to be rare earth element Yb, as an example. The absorption and emission characteristics of Yb are as shown in FIG. 5. The wavelength $\lambda_A$ of the laser beam for processing, wavelength $\lambda_P$ of the pump light, and element for optical amplification E1 are the same as the examples used for describing the operation of the optical amplification module 1. Therefore for the same reason as the first embodiment, the later mentioned functions and effects of the optical module 81 remain the same even if a wavelength 915 nm band is used as the excitation LD, or even if the wavelength of the laser beam for processing is set to one in the wavelength 1020 to 1080 nm range.

It is also assumed that the element for optical absorption E2, which was added to the clad area (first clad area) 90B of the optical fiber for guiding 90, is rare earth element Tm, as an example. The absorption characteristic of Tm is as shown in FIG. 6. As mentioned above, in Tm, the absorption coefficient is small for light having a wavelength of about 974 nm, and the absorption coefficient is large for light having a wavelength of about 1060 nm. In other words, Tm, as the element for optical absorption E2, has the characteristic of mainly absorbing a laser beam for processing rather than the pump light, and as a result greater transmission loss is generated in the laser beam for processing by Tm.

In the optical amplification module 6 that satisfies the above conditions, if each pump light source 40 outputs an pump light having a wavelength of about 974 nm, the pump light propagates the optical fiber 52 connected to each pump light source 40 in multi-transverse-mode, then is input to the optical fiber for guiding 90 via the optical coupling section 53 and the optical fiber 54, and propagates through the optical fiber for guiding 90 toward the optical amplification fiber 20.

Tm has been added to the clad area (first clad area) 90B of the optical fiber for guiding 90 as the element for optical absorption E2, but Tm absorbs little light having a wavelength of about 974 nm, as shown in FIG. 6, so the pump light enters the optical amplification fiber 20 with certainty. And the pump light which entered the optical amplification fiber 20 propagates toward the edge section 20b, while exciting Yb, which is the element for optical amplification E1 added to the core area 20A.

When the light source 10 outputs the laser beam for processing having wavelength 1060 nm, the laser beam for processing propagates through the optical fiber 51 and is input to the optical fiber for guiding 90 via the optical coupling section 53 and the optical fiber 54. The laser beam for processing, which is input to the optical fiber for guiding 90, propagates through the core area 90A of the optical fiber for guiding 90, and is input to the optical amplification fiber 20, and then propagates through the core area 20A of the optical amplification fiber 20 toward the edge section 20b.

At this time, if Yb, which is the element for optical amplification E1 added to the core area 20A, is being excited by the pump light as mentioned above, an induced emission is generated by the laser beam for processing, so the laser beam for processing is optically amplified. Therefore an optically amplified high power laser beam for processing is output from the edge section 20b of the optical amplification fiber 20.

In the optical amplification module 6, it is important that the optical module 81 has an optical fiber for guiding 90, and the optical fiber for guiding 90 is formed between the optical coupling means 50 and the optical amplification fiber 20. Now the functions and effects of the optical module 81 having the optical fiber for guiding 90 will be described in comparison with the optical amplification module 150 shown in FIG. 14, to which the optical module 160 for comparison is applied.

Figure 14:
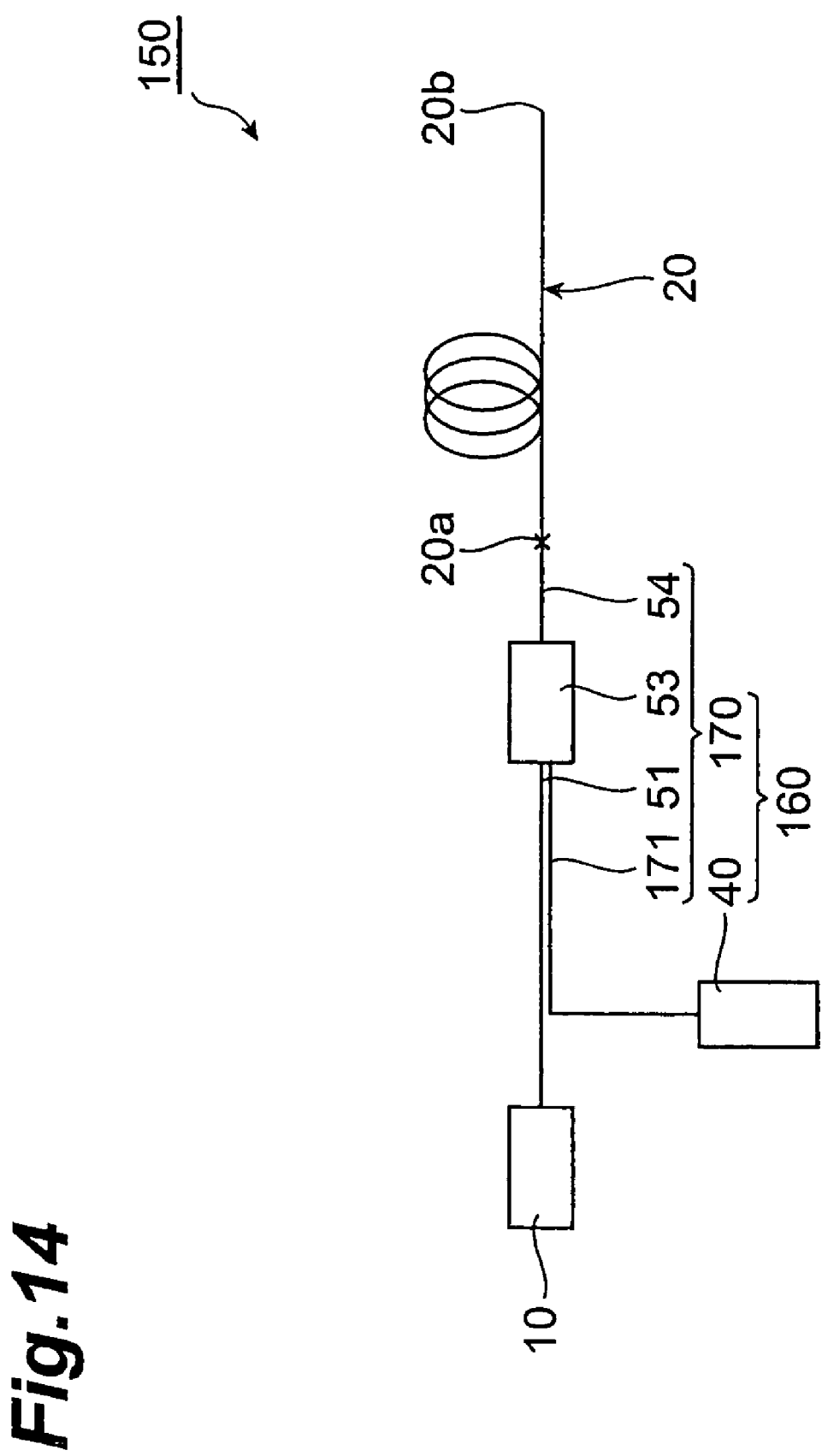
FIG. 14 is a block diagram depicting another configuration of the optical amplification module for comparison.

The optical module 160 of the optical amplification module 150 for comparison, shown in FIG. 14, has an pump light source 40 and an optical coupling means 170, and the optical coupling means 170 is comprised of optical fibers 51 and 171 as the input ports of the laser beam for processing and an pump light, an optical coupling section 53 as a multiplexing medium of the laser beam for processing and pump light, and an optical fiber 54 as an output port of the optical coupling means 170. In the following description, it is assumed that the configuration of the optical fiber 171 is the same as the configuration of the optical fiber 52, and the optical fiber 171 is a multi-mode fiber for propagating the pump light in multi-transverse-mode.

In the optical amplification module 150, the light source 10 is optically connected to the optical fiber 51 of the optical module 160, and the optical amplification fiber 20 is optically connected to the optical fiber 54. In FIG. 14, only one pump light source 40 is shown to simplify description.

In the optical amplification module 160, the laser beam for processing from the light source 10 and the pump light from the pump light source 40 are supplied to the optical amplification fiber 20 via the optical coupling means 170, and the laser beam for processing is optically amplified by the optical amplification fiber 20, and then output as a high power laser beam for processing from the edge section 20b.

If the edge section 20b of the optical amplification fiber 20 is connected with another optical fiber, a connection loss may be generated at the connected portion due to an MFD mismatch or axis shift, and a high power laser beam for processing for the amount of the loss may enter the clad area 20B (see FIG. 2A) of the optical amplification fiber 20 as a return light.

Also if the optical amplification module 150 is applied to an optical processing system, as mentioned above, a high intensity laser beam for processing, which is output from the edge section 20b, may enter the clad area 20B as a return light due to other optical elements (lens, mirrors) of the optical processing system. In such cases, a laser beam for processing, which propagates through the propagation area of the pump light toward the pump light source 40, could exist.

In the case of the optical amplification module 150, in which the optical fiber 54 of the optical module 160 and the optical amplification fiber 20 are optically connected, the high power laser beam for processing, which propagates through the optical amplification fiber 20 in a direction opposite from the pump light, is input to the optical fiber 54 while maintaining this output, and then propagates through the optical module 160 in a direction opposite from the propagation direction of the pump light.

A possible way to prevent the input of a high power laser beam for processing to the pump light source 40 is installing an isolator or a fiber grating in the optical fiber 171 as an input port of the pump light, but for the same reason as the case of the optical module for optical amplification shown in FIG. 7, a high power laser beam for processing may reach the pump light source 40, and the pump light source 40 may be damaged and operation thereof may become unstable, then the high power laser beam for processing cannot be output stably.

In the case of the above mentioned optical amplification module 6, on the other hand, the optical module 81 has the optical fiber for guiding 90, and the optical amplification fiber 20 is optically connected to the optical fiber for guiding 90. Because of this, the optical fiber for guiding 90, where the element for optical absorption E2 is added to the clad area (first clad area) 90B, is disposed between the optical coupling means 50 and the optical amplification fiber 20. Therefore even if the laser beam for processing propagates from the optical amplification fiber 20 to the optical coupling means 50, as mentioned above, a large transmission loss is generated in the laser beam for processing when the laser beam for processing passes through the optical fiber for guiding 90 because of the absorption by the element for optical absorption E2. Therefore the pump light source 40 is not damaged and does not operate unstably by the laser beam for processing as a return light, so the pump light can be stably supplied to the optical amplification fiber 20, and as a result, in the optical amplification module 6, the laser beam for processing can be stably output from the edge section 20b.

Also the pump light which is output from each pump light source 40 is propagated in multi-transverse-mode using the optical fiber 52, so more pump light can be supplied to the optical amplification fiber 20 compared with the case of using an optical fiber which propagates the pump light in single mode. Since the laser beam for processing can be efficiently amplified, a higher power laser beam for processing can be output. As a consequence, in the optical amplification module 6, a high power laser beam for processing can be output stably from the edge section 20b.

As mentioned above, the element for optical absorption E2 is for preventing the laser beam for processing from reaching the pump light source 40 as a return light, and damaging the pump light source 40. Therefore all that is required of the element for optical absorption E2 to be added to the optical fiber for guiding 90 is that the element for optical absorption can suppress the transmission of the laser light for processing so as not to damage the pump light source 40 and make operation thereof unstable, and can propagate the pump light.

When the laser beam for processing is input to the optical amplification fiber 20 via the optical fiber for guiding 90, as the case of the optical amplification module 6, it is preferable that the MFD of the optical amplification fiber 20 is the same as or greater than the MFD of the optical fiber for guiding 90 in the wavelength $\lambda_A$ of the laser beam for processing, in terms of further suppressing the entry of the laser beam for processing to the pump light source 40 as a return light.

By this configuration, the connection loss at the connected portion between the optical fiber for guiding 90 and the optical amplification fiber 20 decreases, so a return of the laser beam for processing to the optical coupling means 50 side can be suppressed. As a result, the laser beam for processing barely enters the pump light source 40, so a high power laser beam for processing can be generated even more stably. Also in terms of decreasing the connection loss at the connected portion between the optical fiber 54 and the optical fiber for guiding 90, it is preferable that the mode field diameter (MFD) of the optical fiber for guiding 90 in the wavelength kA of the laser beam for processing is the same as or greater than the MFD of the optical fiber 54.

The above mentioned greater/smaller relationship of the MFDs of the optical amplification fiber 20 and the optical fiber for guiding 90 is especially effective when the element for optical amplification E1 has been added to the core area 90A of the optical fiber for guiding 90

When the element for optical amplification E1 has been added to the core area 90A, the optical fiber for guiding 90 also functions as an optical amplification fiber. Therefore the optically amplified laser beam for processing reaches the connected portion between the optical amplification fiber 20 and the optical fiber for guiding 90. If the MFD of the optical amplification fiber 20 is the same as or greater than the MFD of the optical fiber for guiding 90 in the wavelength XA, as mentioned above, a return of the high power laser beam for processing to the pump light source 40 is suppressed, and as a result, a high power laser beam for processing can be stably output from the edge section 20b.

Seventh Embodiment

Figure 15:
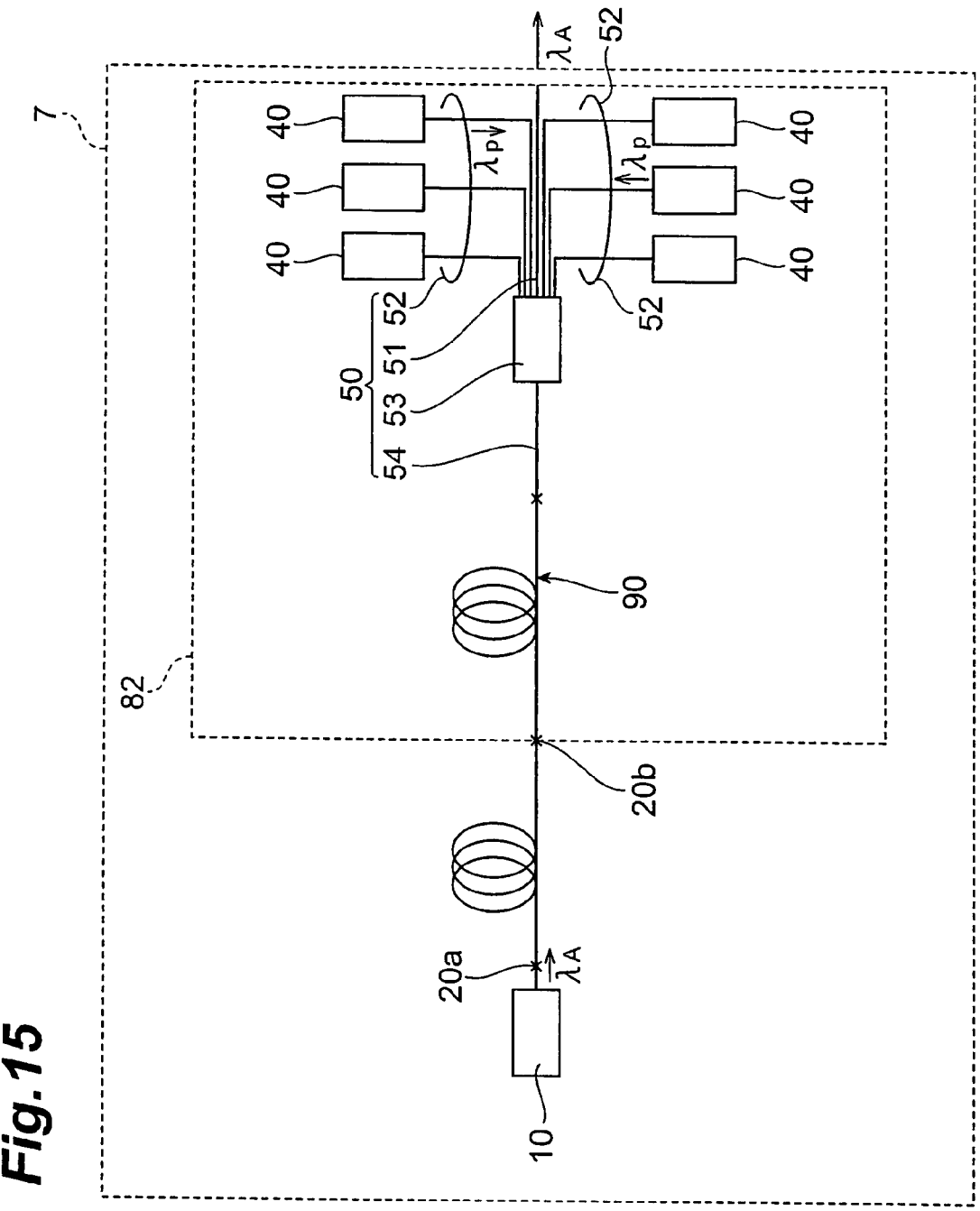
FIG. 15 is a block diagram depicting a configuration of another embodiment of the optical amplification module.

FIG. 15 is a block diagram depicting a configuration of an optical amplification module according to the seventh embodiment. The optical amplification module 7 is a back-excitation type optical amplification module.

In the optical amplification module 7, a light source 10 with a single mode fiber or LMA fiber is connected to an edge section 20a of an optical amplification fiber 20, and a laser beam for processing, which is output from the light source 10, propagates through the optical amplification fiber 20 from the edge section 20a to an edge section 20b. An optical module 82 is optically connected to the edge section 20b of the optical amplification fiber 20.

In the optical module 82, pump light sources 40 are optically connected to optical fibers 52 of optical coupling means 50, just like the case of the optical module 81 of the sixth embodiment, and an optical fiber for guiding 90 is optically connected to an optical fiber 54. In the present embodiment, the optical fiber for guiding 90 is optically connected to the edge section 20b of the optical amplification fiber 20. According to this configuration, the optical fiber 54 functions as an input port of the laser beam for processing, and functions as an output port of the pump light. An optical fiber 51 functions as an output port.

Now the operation of the optical amplification module 7 will be described. The pump light, which is output from the pump light source 40, is input to the optical fiber for guiding 90 via the optical coupling means 50, propagates through the optical fiber for guiding 90, and is input to the optical amplification fiber 20. The pump light, which is input to the optical amplification fiber 20, excites an element for optical amplification E1 while propagating toward the edge section 20a. The laser beam for processing, which is output from the light source 10, is input to the optical amplification fiber 20 from the edge section 20a, and propagates through the optical amplification fiber 20 to the optical coupling means 50.

If the laser beam for processing is input from the light source 10 to the optical amplification fiber 20 in a state where the element for optical amplification E1 is being excited, an induced emission is generated and the laser beam for processing is optically amplified. After the optically amplified laser beam for processing is input to the optical fiber 51 via the optical fiber 54 and an optical coupling section 53, it is output from the edge section of an optical fiber 51. As a result, a high power laser beam for processing is output from the optical fiber 51.

In the optical amplification module 7 as well, the optical module 32 has the optical fiber for guiding 90 where an element for optical absorption E2 has been added to a clad area (first clad area) 90B, so as to supply the pump light to the optical amplification fiber 20 via the optical fiber for guiding 90.

Therefore even if the laser beam for processing enters the clad area 90B of the optical fiber for guiding 90 due to an MFD mismatch or axis shift at the connected portion between the optical amplification fiber 20 and the optical fiber for guiding 90, a large transmission loss is generated in the laser beam for processing by the element for optical absorption E2. As a result, the reaching of the laser beam for processing for the amount of loss generated by the connection loss to the pump light source 40 can be suppressed. Therefore a high power laser beam for processing does not damage the pump light source 40 and does not cause an unstable operation, and a high power laser beam for processing can be stably output.

If the laser beam for processing is input from the optical amplification fiber 20 to the optical fiber for guiding 90, as in the case of the optical amplification module 7, it is preferable that the MFD of the optical amplification fiber 20 is the same as or greater than the MFD of the optical fiber for guiding 90 in the wavelength $\lambda_A$ of the laser beam for processing in terms of suppressing the entry of the laser beam for processing to the pump light source 40, just like the case of the optical amplification module 6.

By this, the connection loss of the laser beam for processing decreases at the connected portion between the optical fiber for guiding 90 and the optical amplification fiber 20. Therefore entry of the laser beam for processing to the pump light source 40 as a return light is further suppressed, and as a result, a high power laser beam for processing can be generated more stably. Also in terms of further suppressing the return light of the laser beam for processing, it is more preferable that the MFD of the optical fiber 54 is the same as or greater than the MFD of the optical fiber for guiding 90 in the wavelength $\lambda_A$.

The optical module 82 has a plurality of pump light source 40, but may have only one pump light source, just like the case of the sixth embodiment.

Eighth Embodiment

Figure 16:
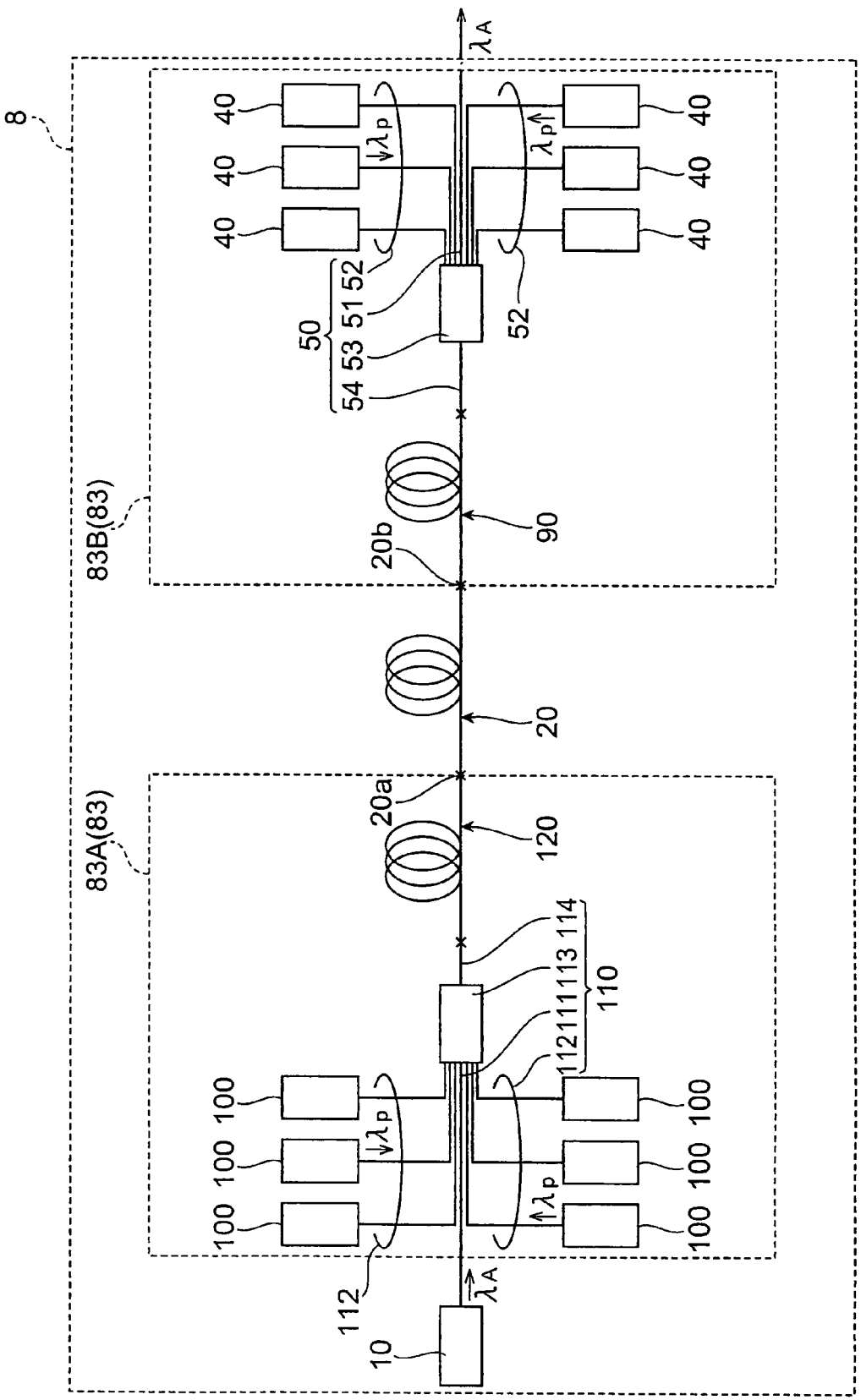
FIG. 16 is a block diagram depicting a configuration of still another embodiment of the optical amplification module.

FIG. 16 is a block diagram depicting a configuration of an optical amplification module according to the eighth embodiment. The optical amplification module 8 is a bidirectional excitation type optical amplification module. Another embodiment of the optical module according to the present invention is applied to the optical amplification module 8.

The optical amplification module 8 comprises a light source 10, an optical amplification fiber 20 and optical modules 83. In the following description, a direction from an edge section 20a to an edge section 20b of the optical amplification fiber 20 is called the "forward direction" and a direction from the edge section 20b to the edge section 20a is called the "backward direction".

The optical modules 83 has a forward light supply section 83A, which is disposed on the edge section 20a side of the optical amplification fiber 20 and supplies pump light to the optical amplification fiber 20 in the forward direction, and a backward light supply section 83B, which is disposed on the edge section 20b side of the optical amplification fiber 20 and supplies pump light to the optical amplification fiber 20 in the backward direction.

The configuration of the backward light supply section 83B is the same as the configuration of the optical module 82 of the seventh embodiment. In other words, the backward light supply section 83B has pump light sources 40, optical coupling means 50, and an optical fiber for guiding 90, and the pump light sources 40 and the optical fiber for guiding 90 are optically connected to the optical coupling means 50. The backward light supply section 83B is optically connected to the optical amplification fiber 20, with the optical fiber for guiding 90 being optically connected to the edge section 20b of the optical amplification fiber 20.

The forward light supply section 83A has other pump light sources 100, another optical coupling means 110 and another optical fiber for guiding 120, which are different from the pump light sources 40, optical coupling means 50 and optical fiber for guiding 90 of the backward light supply section 83B.

The configuration of the optical fiber for guiding 120 is the same as the configuration of the optical fiber for guiding 90 of which a cross-sectional configuration is shown in FIG. 13. In other words, the optical fiber for guiding 120 has a core area (third core area) 90A, a clad area (fifth clad area) 90B which is formed in an outer circumference of the core area 90A and has a refractive index smaller than that of the core area 90A, and a clad area (sixth clad area) 90C which is formed in an outer circumference of the clad area 90B and has a refractive index smaller than that of the clad area 90B. An element for optical absorption E2 is added to the clad area 90B of the optical fiber for guiding 120, just like the case of the optical fiber for guiding 90. In the optical fiber for guiding 120, the laser beam for processing is propagated in the core area 90A, and the pump lights are propagated in multi-transverse-mode in the core area 90A and the clad area 90B.

The configurations of the pump light source 100 and the optical coupling means 110 are the same as those of the pump light source 40 and the optical coupling means 50. Optical fibers 111 and 112, an optical coupling section 113 and an optical fiber 114 of the optical coupling means 110 correspond to the optical fibers 51 and 52, the optical coupling section 53 and the optical fiber 54 of the optical coupling means 50, and the configurations of the optical fibers 111, 112, 114 and the optical coupling section 113 are the same as the configurations of the optical fibers 51, 52, 54 and the optical coupling section 53. The wavelength of the pump light (the other pump light) which is output from the pump light source 100 may be different from the wavelength $\lambda_P$ of the pump light which is output from the pump light source 40, if it is in a range in which the element for optical amplification E1 can be excited.

As FIG. 16 shows, the light source 10 is optically connected to the optical fiber 111, and the optical fiber 111 functions as an input port of the laser beam for processing which is output from the light source 10. The optical fiber 112 is optically connected to the pump light source 100, and functions as an input port of the pump light which is output from the pump light source 100. The optical fiber 114 is optically connected to the optical fiber for guiding 90, and functions as an output port for outputting the laser beam for processing and pump light which are input via the optical fibers 111 and 112 to the optical fiber for guiding 90.

Specifically, the optical fiber 114 propagates the laser beam for processing, and inputs it to the core area 90A of the optical fiber for guiding 120, and propagates the pump lights in multi-transverse-mode, and inputs them to the core area 90A and the clad area 90B.

In the optical amplification module 8, the MFD of the optical fiber for guiding 120 is the same as or greater than the MFD of the optical fiber 114, and the MFD of the optical amplification fiber 20 is the same as or greater than the MFD of the optical fiber for guiding 120 in the wavelength $\lambda_A$ of the laser beam for processing. Also in the wavelength $\lambda_A$ of the laser beam for processing, the MFD of the optical fiber for guiding 90 is the same as or greater than the MFD of the optical amplification fiber 20, and the MFD of the optical fiber 54 is the same as or greater than the MFD of the optical fiber for guiding 90.

The operation of the optical amplification module 8 will now be described. In the optical amplification module 8, the pump lights from the pump light sources 40 of the backward light supply section 83B are input to the optical amplification fiber 20 from the edge section 20b via the optical coupling means 50 and the optical fiber 54, propagate through the optical amplification fiber 20 in the backward direction, and excite the element for optical amplification E1. The other pump lights from the pump light sources 100 of the forward light supply section 83A are input to the optical amplification fiber 20 from the edge section 20a via the optical coupling means 110 and the optical fiber for guiding 120, propagate through the optical amplification fiber 20 in the forward direction, and excite the element for optical amplification E1.

When the element for optical amplification E1 is being excited like this, if the laser beam for processing, which is output from the light source 10, is input to the optical amplification fiber 20 via the optical fiber 111, optical coupling section 113 and optical fiber 114 of the forward light supply section 83A, the laser beam for processing is optically amplified. The optically amplified laser beam for processing is input to the optical fiber for guiding 90 of the backward light supply section 83B, which is optically connected to the edge section 20b, in the same way as the seventh embodiment. The laser beam for processing, which is input to the optical fiber for guiding 90, is input to the optical fiber 51, which functions as an output port in this embodiment, via the optical coupling section 53, propagates through the optical fiber 51, and then is output from the edge section.

In this case as well, each pump light, which is output from each pump light source 40 and 100, is input to the optical amplification fiber 20 via the optical fibers for guiding 90 and 120 to which the element for optical absorption E2 has been added. Therefore even if a high power laser beam for processing propagates in an opposite direction of each pump light which propagates in the forward or backward direction, a high power laser beam for processing does not enter the pump light sources 40 and 100, just like the cases of the optical amplification modules 6 and 7 of the sixth and seventh embodiments. In the wavelength of the laser beam for processing, the MFDs of the optical fiber 114, optical fiber for guiding 120, optical amplification fiber 20, optical fiber for guiding 90 and optical fiber 54 are the same or greater on the side where the laser beam for processing enters, therefore the connection loss at the connected portion of the adjacent optical fibers (e.g. connected portion between the optical fiber for guiding 120 and the optical amplification fiber 20) is decreased. As a result, the pump light can be stably supplied to the optical amplification fiber 20, so a high power laser beam for processing can be stably generated.

In the present embodiment as well, the optical module 83 has a plurality of pump light sources 40 and 100, but the number of pump light sources 70 of the forward light supply section 83A and the number of pump light sources 40 of the backward light supply section 83B may only be one, just like the cases of the optical modules 81 and 82 of the sixth and seventh embodiments.

In the case of optical amplification module 8 for the greater/smaller relationship of the MFDs of the optical fiber for guiding 120 and the optical fiber 114, and for the greater/smaller relationship of the MFDs of the optical fiber 54 and the optical fiber for guiding 90 in the wavelength $\lambda_A$ of the laser beam for processing, the MFDs are the same or the MFD of the optical fiber on the side to which the laser beam for processing enters is greater, but it is sufficient if at least the MFD of the optical fiber for guiding 90 in the wavelength $\lambda_A$ is the same as or greater than the MFD of the optical fiber for guiding 120 in the wavelength $\lambda_A$. In the present embodiment, the forward light supply section 83A has the pump light sources 100, but it is sufficient if the optical module 83 has at least the pump light source 40.

As described above, according to the optical module of the present invention, the pump lights can be stably supplied to the optical amplification fiber. Therefore a high power light can be stably output from the optical amplification fiber.

The embodiments of the optical module of the present invention were described, but the optical module and the optical amplification module according to the present invention are not limited to those described in the first to eighth embodiments.

In the optical amplification modules 1 to 8, the light source 10 is installed, but the light source 10 need not always be installed. For example, in the optical amplification modules 1 and 6 in FIG. 1 and FIG. 12, a resonator structure can be created by the edge section of the optical fiber 51 on the side where the light source 10 is connected, and the edge section 20b on the output side of the optical amplification fiber 20. In this case, the laser oscillation is performed in the optical amplification module 1 or 6, whereby a high intensity light having wavelength $\lambda_A$ can be output from the optical amplification module 1 or 6.

FIG. 3 showed an example of the optical coupling means 50, but the optical coupling means 50 is not limited to the one shown in FIG. 3, or the one comprising the optical fibers 51, 52, 54 and the optical coupling section 53. The optical coupling means 50 is sufficient if it is an optical coupler which can input the pump light to the optical amplification fiber 20 directly or via the optical fiber for guiding 90, and can input the to-be-amplified light to the optical amplification fiber 20 directly or via the optical fiber for guiding 90 (or can output the to-be-amplified light which is optically amplified in the optical amplification fiber 20). The optical coupling means 50 has the optical fiber 54, but the optical coupling section 53 and the optical fiber for guiding 90 or the optical amplification fiber 20 may be directly connected without installing the optical fiber 54.

In the optical amplification modules 2 and 3 to which the optical module 32 is applied as well, the optical module 33 or 34 can be used instead of the optical module 32.

The optical guide section 60 of the optical module 31 or 32 may comprise only the second optical fiber for guiding 62.

The element for optical absorption E2 as the loss medium is sufficient if it is added to at least one of the first and second optical fibers for guiding 61 and 62.

In the above description, the optical amplification modules 1-8 have fiber laser light sources used for an optical processing system, and a laser beam for laser processing is output from the light source 10, but the present invention is not limited to this, and may output a signal light for optical communication in an optical communication system, for example.

From the invention thus described, it will be obvious that the invention may be varied in many ways. Such variations are not to be regarded as a departure from the spirit and scope of the invention, and all such modifications as would be obvious to one skilled in the arts are intended for inclusion within the scope of the following Claims.

What is claimed is:

1. An optical module for supplying pump light for amplifying to-be-amplified light, comprising:
    an pump light source;
    optical coupling means; and
    an optical guide section, wherein
    said optical guide section optically connects said pump light source and said optical coupling means, and propagates said pump light, which is output from said pump light source, in multi-transverse-mode,
    said optical coupling means comprises a first input port to which said to-be-amplified light is input, a second input port to which said pump light from said optical coupling means is input, and an output port having a fiber structure which outputs said to-be-amplified light, and said pump light is output from said first input port or said output port in multi-transverse-mode,
    at least one of (i) at least one of end faces, of which said optical guide section and said optical coupling means are connected, (ii) an area between said end faces of said optical guide section and said optical coupling means, and (iii) said optical guide section having a loss medium of which transmission loss is greater in a wavelength of said to-be-amplified light than in a wavelength of said pump light,
    said optical guide section comprises a first optical fiber for guiding and a second optical fiber for guiding, and said loss medium is formed between said first and second optical fibers for guiding, and
    said loss medium is a coating formed on a fiber end face of at least one of said first and second optical fibers for guiding.

2. An optical module for supplying pump light for amplifying to-be-amplified light, comprising:
    an pump light source;
    optical coupling means; and
    an optical guide section, wherein
    said optical guide section optically connects said pump light source and said optical coupling means, and propagates said pump light, which is output from said pump light source, in multi-transverse-mode,
    said optical coupling means comprises a first input port to which said to-be-amplified light is input, a second input port to which said pump light from said optical coupling means is input, and an output port having a fiber structure which outputs said to-be-amplified light, and said pump light is output from said first input port or said output port in multi-transverse-mode,
    at least one of (i) at least one of end faces, of which said optical guide section and said optical coupling means are connected, (ii) an area between said end faces of said optical guide section and said optical coupling means, and (iii) said optical guide section having a loss medium of which transmission loss is greater in a wavelength of said to-be-amplified light than in a wavelength of said pump light, and said loss medium is a coating formed on at least one of end faces of which said optical guide section and said optical coupling means are connected.

3. An optical amplification module, comprising:
an optical module for supplying pump light for amplifying to-be-amplified light, comprising:
  an pump light source;
  optical coupling means; and
  an optical guide section, wherein
    said optical guide section optically connects said pump light source and said optical coupling means, and propagates said pump light, which is output from said pump light source, in multi-transverse-mode,
    said optical coupling means comprises a first input port to which said to-be-amplified light is input, a second input port to which said pump light from said optical coupling means is input, and an output port having a fiber structure which outputs said to-be-amplified light, and said pump light is output from said first input port or said output port in multi-transverse-mode,
    at least one of (i) at least one of end faces, of which said optical guide section and said optical coupling means are connected, (ii) an area between said end faces of said optical guide section and said optical coupling means, and (iii) said optical guide section having a loss medium of which transmission loss is greater in a wavelength of said to-be-amplified light than in a wavelength of said pump light,
    said optical guide section comprises an optical fiber for guiding having a first core area for propagating said pump light from said optical coupling means in multi-transverse-mode, a first clad area which has a refractive index lower than a refractive index of said first core area, a second clad area provided in an outer circumference of said first clad area and having a refractive index lower than the refractive index of said first clad area, and an element as said loss medium is added to said first core area, and
  and an optical amplification fiber to which said pump light from said optical coupling means is input and which amplifies and outputs said to-be-amplified light, wherein
    said optical amplification fiber comprises a second core area, a third clad area having a refractive index lower than a refractive index of said second core area, and a fourth clad area provided in an outer circumference of said third clad area and having a refractive index lower than the reference index of said third clad area, said to-be-amplified light is propagated in said second core area, and said pump light from said optical coupling means is propagated in said second core area and said third clad area.

4. The optical module according to claim 3, wherein said element is Tm.

5. The optical module according to claim 3, wherein said element is a rare earth element.

6. The optical amplification module according to claim 3, wherein said optical guide section comprises an optical fiber for guiding having a first core area for propagating said pump light from said optical coupling means in multi-transverse-mode and a first clad area having a refractive index lower than a refractive index of said first core area, and an element as said loss medium is added to said first core area.

7. The optical amplification module according to claim 3, wherein said optical guide section comprises a first optical fiber for guiding and a second optical fiber for guiding, and said loss medium is provided between said first and second optical fibers for guiding.

8. The optical amplification module according to claim 7, wherein said loss medium is a coating formed on a fiber end face of at least one of said first and second optical fibers for guiding.

9. The optical amplification module according to claim 3, wherein said loss medium is a coating formed on at least one of end faces of which said optical guide section and said optical coupling means are connected.

10. The optical amplification module according to claim 6, wherein said loss medium is Tm, and Yb is added to said optical amplification fiber.

11. An optical module for supplying pump light for amplifying to-be-amplified light, comprising:
  a pump light source;
  optical coupling means; and
  an optical guide fiber for guiding, wherein
    said optical coupling means optically connects said pump light source and said optical guide fiber and outputting the pump light from said pump light source to said optical guide fiber,
    said optical guide fiber comprises a first core area, a first clad area provided in an outer circumference of said first core area and having a refractive index lower than a refractive index of said first core area, and a second clad area provided in an outer circumference of said first clad area and having a refractive index lower than the refractive index of said first clad area,
    said to-be-amplified light is propagated in said first core area, and said pump light from said optical coupling means is propagated in multi-transverse-mode in said first core area and said first clad area, and
    an element having a transmission loss which is greater in a wavelength of said to-be-amplified light than a wavelength of said pump light is added to said first clad area.

12. The optical module according to claim 11, wherein said element is a rare earth element.

13. The optical module according to claim 11, wherein said element is Tm.

14. An optical amplification module comprising the optical module according to claim 11, and an optical amplification fiber to which said pump light from said optical fiber for guiding is input and which amplifies and outputs said to-be-amplified light, wherein
    said optical amplification fiber comprises a second core area, a third clad area provided in an outer circumference of said second core area and having a refractive index lower than a refractive index of said second core area, and a fourth clad area provided in an outer circumference of said third clad area and having a refractive index lower than the refractive index of said third clad area, said to-be-amplified light is propagated in said second core area, and said pump light from said optical fiber for guiding is propagated in said second core area and said third clad area.

15. The optical amplification module according to claim 14, wherein when said to-be-amplified light which is output from said optical fiber for guiding is input to said optical amplification fiber, a mode field diameter of said optical amplification fiber is the same as or greater than a mode field diameter of said optical fiber for guiding in a wavelength of said to-be-amplified light.

16. The optical amplification module according to claim 14, wherein when said to-be-amplified light which is output from said optical amplification fiber is input to said optical fiber for guiding, a mode field diameter of said optical amplification fiber is the same as or smaller than a mode field diameter of said optical fiber for guiding in a wavelength of said to-be-amplified light.

17. The optical amplification module according to claim 14, comprising another optical coupling means which is different from said optical coupling means and another optical fiber for guiding which is different from said optical fiber for guiding when said to-be-amplified light which is output from said optical amplification fiber is input to said optical fiber for guiding, wherein said optical fiber for guiding and said other optical fiber for guiding are separately disposed on both sides of said optical amplification fiber and optically connected to said optical amplification fiber, said to-be-amplified light and other pump light which is different from said pump light are input to said other optical coupling means, and said other optical coupling means outputs said to-be-amplified light and said other pump light, which have been input, to said other optical fiber for guiding, said other optical fiber for guiding inputs said to-be-amplified light and said other pump light, which have been input, to said optical fiber for guiding of said optical amplification fiber, said other optical fiber for guiding comprises a third core area, a fifth clad area provided in an outer circumference of said third core area and having a refractive index lower than a refractive index of said third core area, and a sixth clad area provided in an outer circumference of said fifth clad area and having a refractive index lower than the refractive index of said first clad area, said to-be-amplified light is propagated in said third core area and other pump light from said other optical coupling means is propagated in multi-transverse-mode in said third core area and said fifth clad area, an element having transmission loss which is greater in a wavelength of said to-be-amplified light than in a wavelength of said other pump light is added to said fifth clad area, and a mode field diameter of said optical fiber for guiding is the same as or greater than a mode field diameter of said other optical fiber for guarding in a wavelength of said to-be-amplified light.

18. The optical amplification module according to claim 14, wherein said element is Tm, and Yb is added to said optical amplification fiber.

* * * * *